(12) United States Patent
Ogura et al.

(10) Patent No.: US 11,320,536 B2
(45) Date of Patent: May 3, 2022

(54) IMAGING DEVICE AND MONITORING DEVICE

(71) Applicant: Sony Semiconductor Solutions Corporation, Kanagawa (JP)

(72) Inventors: Yohei Ogura, Kanagawa (JP); Kensei Jo, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/610,283

(22) PCT Filed: Apr. 16, 2018

(86) PCT No.: PCT/JP2018/015743
§ 371 (c)(1),
(2) Date: Nov. 1, 2019

(87) PCT Pub. No.: WO2019/012770
PCT Pub. Date: Jan. 17, 2019

(65) Prior Publication Data
US 2021/0096250 A1    Apr. 1, 2021

(30) Foreign Application Priority Data
Jul. 11, 2017    (JP) .............................. JP2017-135381

(51) Int. Cl.
*G01N 21/55* (2014.01)
*G01S 17/08* (2006.01)
(Continued)

(52) U.S. Cl.
CPC .............. *G01S 17/08* (2013.01); *G01N 21/27* (2013.01); *G01N 21/55* (2013.01); *G06K 9/6201* (2013.01);
(Continued)

(58) Field of Classification Search
None
See application file for complete search history.

(56) References Cited

U.S. PATENT DOCUMENTS

2010/0208234 A1    8/2010    Kaehler
2011/0213490 A1    9/2011    Liu et al.
(Continued)

FOREIGN PATENT DOCUMENTS

| CN | 1283264 A | 2/2001 |
|---|---|---|
| CN | 1480709 A | 3/2004 |

(Continued)

OTHER PUBLICATIONS

Chinese Office Action dated Jul. 1, 2021 for corresponding Chinese Application No. 2018800287722.
(Continued)

*Primary Examiner* — Eileen M Adams
(74) *Attorney, Agent, or Firm* — Michael Best & Friedrich LLP

(57) ABSTRACT

Provided are an imaging device and a monitoring device capable of accurately measuring a distance and a shape of a region of an object that is difficult to measure by one distance measuring camera.
Provided is an imaging device including a sensor unit configured to irradiate an object with light and detect the light reflected by the object; a distance calculation unit configured to calculate a distance to the object on the basis of sensing data of the sensor unit; a specular reflector located on an opposite side of the sensor unit across the object; and a correction unit configured to correct an error included in the calculated distance, the error being caused by an interference between the light following a first path from the sensor unit toward the object and the light following a
(Continued)

second path from the sensor unit, reflected by the specular reflector, and going toward the object.

20 Claims, 15 Drawing Sheets

(51) Int. Cl.
*G01N 21/27* (2006.01)
*G06K 9/62* (2022.01)
*G06T 7/00* (2017.01)
*H04N 5/225* (2006.01)

(52) U.S. Cl.
CPC ......... *G06T 7/0002* (2013.01); *H04N 5/2256* (2013.01); *G06T 2207/10024* (2013.01); *G06T 2207/30204* (2013.01)

(56) References Cited

U.S. PATENT DOCUMENTS

| | | | |
|---|---|---|---|
| 2013/0002823 A1* | 1/2013 | Lim | G01S 7/481 |
| | | | 348/46 |
| 2014/0307085 A1 | 10/2014 | Ohsawa | |
| 2015/0033647 A1* | 2/2015 | Suhami | E04H 6/10 |
| | | | 52/236.3 |
| 2016/0124089 A1* | 5/2016 | Meinherz | G01S 17/86 |
| | | | 356/5.01 |
| 2016/0334509 A1 | 11/2016 | Gruenwald | |
| 2017/0261311 A1* | 9/2017 | Nagura | G01L 1/24 |

FOREIGN PATENT DOCUMENTS

| | | |
|---|---|---|
| CN | 101796372 A | 8/2010 |
| CN | 101821583 A | 9/2010 |
| CN | 101881920 A | 11/2010 |
| CN | 102742259 A | 10/2012 |
| CN | 102829718 A | 12/2012 |
| CN | 103379288 A | 10/2013 |
| CN | 104568963 A | 4/2015 |
| CN | 105572681 A | 5/2016 |
| JP | 2012-057960 A | 3/2012 |
| JP | 2012-509470 A | 4/2012 |
| JP | 2016-139306 A | 8/2016 |
| JP | 2018-004544 A | 1/2018 |
| WO | 2010/004763 A1 | 1/2010 |
| WO | 2014/097539 A1 | 6/2014 |

OTHER PUBLICATIONS

Ding, Shaowen et, al. "Overview of Non-Contact 3D Reconstruction Measurement Methods" Laser & Optoelectronics Progress, vol. 54, No. 7, Mar. 21, 2017, 27-41.

Dorrington, A. et, al. "Three-Dimensional Imaging, Interaction, and Measurement—Separating True Range Measurements From Multipath and Scattering interference in Commercial Range Cameras" Proc. of SPIE-IS & T Electronic Imaging, vol. 7864, Jan. 27, 2011, 786404-1-786 404-10.

Fuchs, Stefan "Multipath Interference Compensation in Time-of-Flight Camera Images" 2010 International Conference an Pattern Recognition, Dec. 31, 2010 3583-3586.

Huang, Y. et, al., "Multipath Error Analysis of Radio Interferometric Positioning System in Wireless Sensor Networks" Control and Decision, vol. 24, No. 2, Feb. 15, 2009, 231-235.

* cited by examiner

FIG. 4
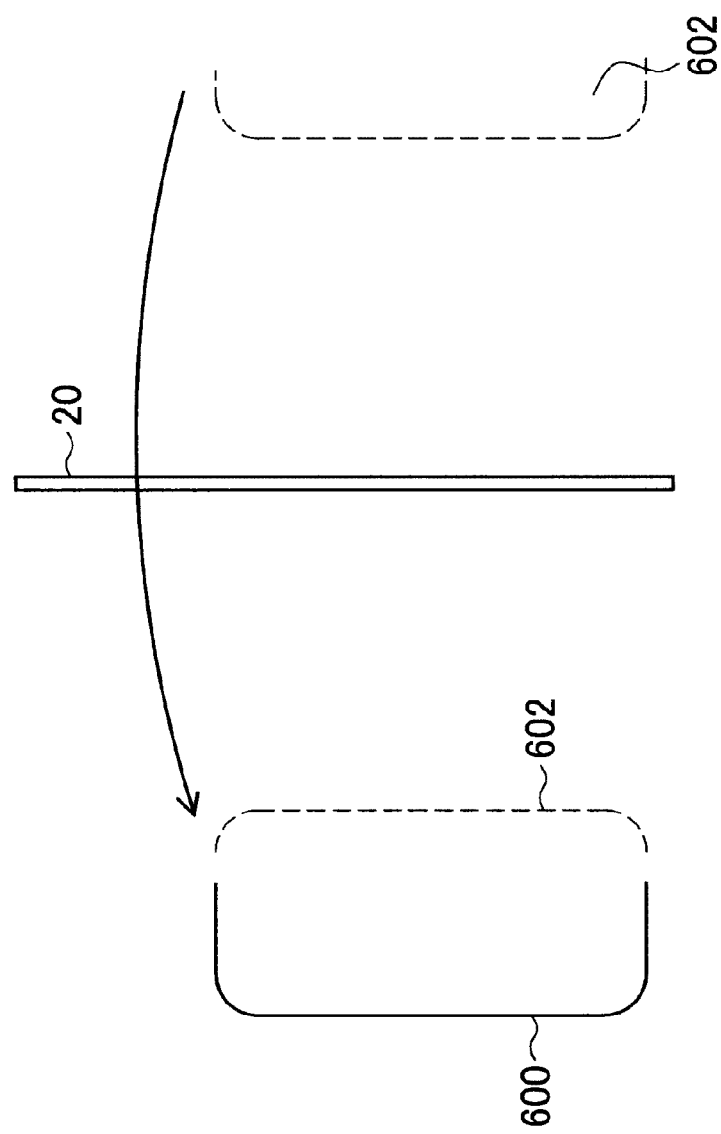
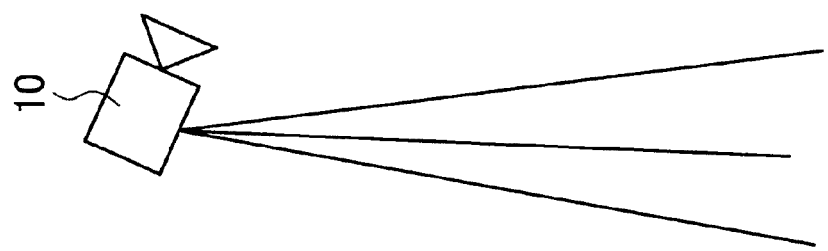

IMAGING DEVICE AND MONITORING DEVICE

TECHNICAL FIELD

The present disclosure relates to an imaging device and a monitoring device.

BACKGROUND ART

Distance measuring cameras that emit infrared light or the like to an object and receive the infrared light reflected by the object to measure a distance to the object or a surface shape of the object are known. An example of such a distance measuring camera includes a technology disclosed in Patent Document 1 below.

By the way, when trying to measure an object with the distance measuring camera, there may be a region that cannot be measured by one distance measuring camera, specifically, a back surface that cannot be directly measured due to blockage by the object itself, or the like. In such a case, it is conceivable to measure the back surface of the object or the like using one distance measuring camera and a specular reflector in combination. As such a method, a technology disclosed in Patent Document 2 below can be cited, for example.

CITATION LIST

Patent Document

Patent Document 1: Japanese Patent Application Laid-Open No. 2012-57960
Patent Document 2: Japanese PCT National Publication No. 2012-509470

SUMMARY OF THE INVENTION

Problems to be Solved by the Invention

By the way, in the case of measuring the object using the specular reflector, there are two paths of light. The light in the first path is light that reaches the object from the distance measuring camera, is directly reflected by the object, and returns to the distance measuring camera. Meanwhile, the light in the second path reaches the specular reflector from the distance measuring camera, is reflected by the specular reflector, reaches the object, and further returns from the object to the distance measuring camera via the specular reflector in the same path. In addition to that, the light from these two different paths may interfere on the same point (surface) of the object (this phenomenon is called interference due to multipath) depending on the shape of the object. In some cases, the distance measuring camera may not be able to correctly measure the distance and shape of the object due to reception of interference light. However, since the technology disclosed in Patent Document 2 does not measure the object in consideration of the interference due to multipath as described above, it is difficult to accurately measure the distance and shape of the object.

Therefore, the present disclosure proposes, in view of the foregoing, new and improved imaging device and monitoring device capable of accurately measuring a distance and a shape of a region of an object that is difficult to directly measure by one distance measuring camera.

Solutions to Problems

According to the present disclosure, provided is an imaging device including: a sensor unit configured to irradiate an object with light and detect the light reflected by the object; a distance calculation unit configured to calculate a distance to the object on the basis of sensing data of the sensor unit; a specular reflector located on an opposite side of the sensor unit across the object; and a correction unit configured to correct an error included in the calculated distance, the error being caused by an interference between the light following a first path from the sensor unit toward the object and the light following a second path from the sensor unit, reflected by the specular reflector, and going toward the object.

Furthermore, according to the present disclosure, provided is an imaging device including: a sensor unit configured to irradiate an object with light and detect the light reflected by the object; a distance calculation unit configured to calculate a distance to the object on the basis of sensing data of the sensor unit; and a correction unit configured to correct an error included in the calculated distance, the error being caused by an interference between the light following a first path from the sensor unit toward the object and the light following a second path from the sensor unit, reflected by a specular reflector located on an opposite side of the sensor unit across the object, and going toward the object.

Furthermore, according to the present disclosure, provided is a monitoring device having an imaging device mounted, the imaging device including: a sensor unit configured to irradiate an object with light and detect the light reflected by the object; a distance calculation unit configured to calculate a distance to the object on the basis of sensing data of the sensor unit; and a correction unit configured to correct an error included in the calculated distance, the error being caused by an interference between the light following a first path from the sensor unit toward the object and the light following a second path from the sensor unit, reflected by a specular reflector located on an opposite side of the sensor unit across the object, and going toward the object.

Effects of the Invention

As described above, according to the present disclosure, an imaging device and a monitoring device capable of accurately measuring a distance and a shape of a region of an object that is difficult to measure by one distance measuring camera can be provided.

Note that the above-described effect is not necessarily limited, and any of effects described in the present specification or other effects that can be grasped from the present specification may be exerted in addition to or in place of the above-described effect.

BRIEF DESCRIPTION OF DRAWINGS

FIG. 4 is an explanatory diagram (part 3) for describing the measurement of the object 50 using the specular reflector 20 according to the embodiment.

MODE FOR CARRYING OUT THE INVENTION

Favorable embodiments of the present disclosure will be described in detail with reference to the appended drawings. Note that, in the present specification and drawings, overlapping description of configuration elements having substantially the same functional configuration is omitted by providing the same sign.

Note that the description will be given in the following order.

Figure 1:
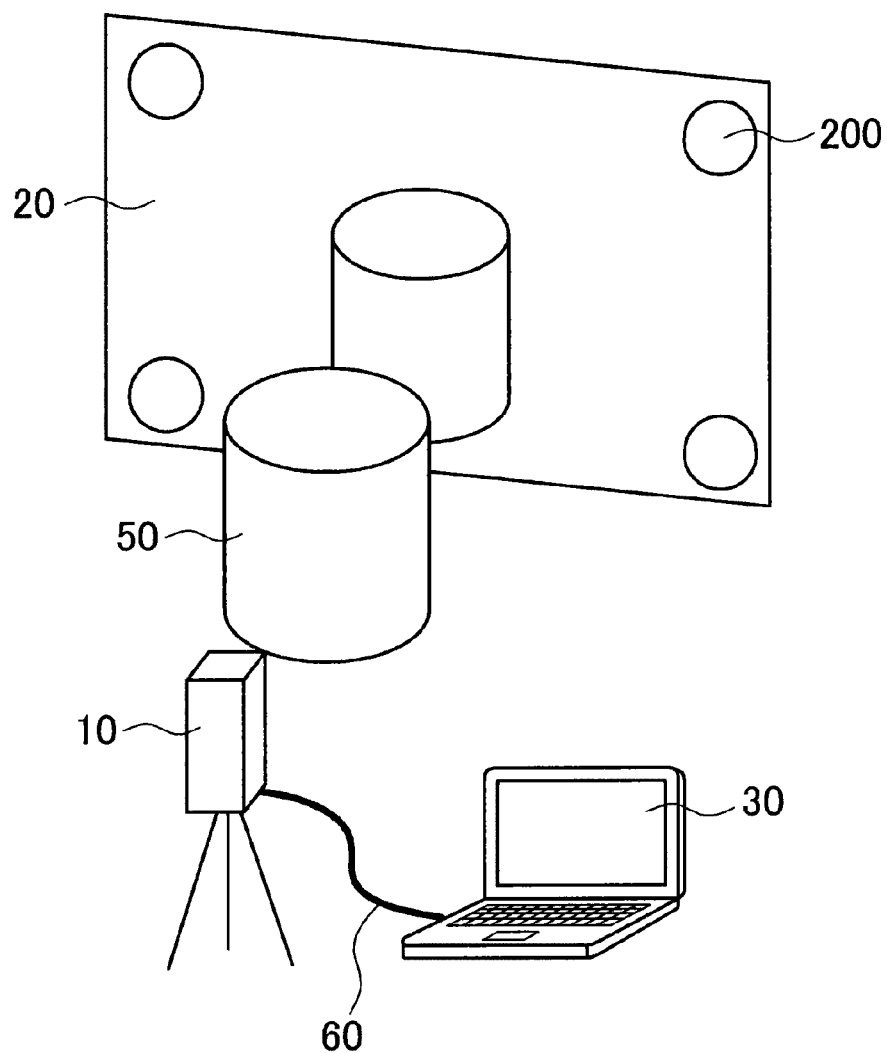
FIG. 1 is a diagram illustrating a configuration example of a distance measuring system 1 according to an embodiment of the present disclosure.

1. Outline of Distance Measuring System 1 According to Embodiment of Present Disclosure
2. Background Leading to Creation of Embodiment According to Present Disclosure by Inventors
3. Details of Each Device Included in Distance Measuring System 1 According to Embodiment of Present Disclosure
   3.1 Detailed Configuration of Distance Measuring Camera 10
   3.2 Detailed Configuration of Processing Device 30
4. Measurement Method According to Embodiment of Present Disclosure
   4.1 Measurement of Specular Reflector
   4.2 Correction of Error Due to Multipath Interference
   4.3 Determining of Presence or Absence of Occurrence of Multipath
5. Application of Embodiment of Present Disclosure
   5.1 Application 1
   5.2 Application 2
   5.3 Application 3
   5.4 Application 4
6. Conclusion
7. Hardware Configuration
8. Supplement 1. Outline of Distance Measuring System 1 According to Embodiment of Present Disclosure First, an outline of a distance measuring system (imaging device) 1 according to an embodiment of the present disclosure will be described with reference to FIG. 1. FIG. 1 is a diagram illustrating a configuration example of the distance measuring system 1 according to the present embodiment. As illustrated in FIG. 1, the distance measuring system 1 according to the present embodiment includes a distance measuring camera 10, a specular reflector 20, and a processing device 30. Furthermore, in FIG. 1, an object 50 for which the distance is measured is illustrated, and the distance measuring camera 10 and the specular reflector 20 are arranged to face each other across the object 50. In other words, the specular reflector 20 is located on the opposite side of the distance measuring camera 10 across the object 50. The distance measuring system 1 according to the embodiment of the present disclosure can capture, for example, a surface of the object 50 with the distance measuring camera 10, the surface corresponding to a back surface as viewed from the distance measuring camera 10, by using the specular reflector 20 even if there is only one distance measuring camera 10. Note that, in FIG. 1, the specular reflector 20 is assumed to have a planar shape and be installed such that a mirror surface of the specular reflector 20 is orthogonal to a floor surface. Hereinafter, an outline of each device included in the distance measuring system 1 will be described.

(Distance Measuring Camera 10)

The distance measuring camera 10 according to the present embodiment is a distance measuring device that measures the distance and shape (depth) of the object 50 using infrared light or the like. Specifically, for example, the distance measuring camera 10 emits irradiation light to the object 50, receives reflection light reflected by the object 50, and detects a phase difference between the irradiation light and the reflection light, thereby measuring the distance and shape of the object 50. Such a distance measuring method is called indirect time of flight (TOF) method. This method is suitable when, for example, measuring the object 50 at a distance of up to about 3 m indoors, or the like.

Furthermore, in the present embodiment, the distance measuring camera 10 may detect a round-trip time of light from when having emitted the irradiation light to when the emission light is received as the reflection light after reflected by the object 50, thereby measuring the distance and shape of the object 50. Such a distance measuring method is called direct TOF method. This method is suitable when, for example, measuring the object 50 located at a distance of up to about 5 m outdoors or the like. Furthermore, the distance measuring camera 10 may be a device that measures the distance (depth) to the object 50 by a structured light method. The structured light method is a method of projecting light having a predetermined pattern on a surface of the object 50 and analyzing deformation of a projected light pattern, thereby estimating the distance to the object 50.

Note that the following description will be given on the assumption that the distance measuring camera 10 is a distance measuring camera compatible with the indirect TOF method. Moreover, the distance measuring camera 10 is assumed to include an imaging unit 120 (see FIG. 6) for imaging the object 50, and the like. Furthermore, a detailed configuration of the distance measuring camera 10 will be described below.

(Specular Reflector 20)

The specular reflector 20 has a surface for specularly reflecting light, which is, for example, a surface made using a metal such as silver or aluminum, a metal film, or the like. Furthermore, in a case where the light emitted from the above-described distance measuring camera 10 is infrared rays, the specular reflector 20 may be a film that reflects the infrared rays.

As illustrated in FIG. 1, the specular reflector 20 is installed to face the distance measuring camera 10 across the object 50. Note that, in the present embodiment, the distance between a mirror surface of the specular reflector 20 and the distance measuring camera 10 and the posture of the specular reflector 20 are assumed to be known before the distance of the object 50 is measured or are assumed to be measured. Furthermore, in the present embodiment, a fixing member 806 (see FIG. 11) for fixing the distance measuring camera 10 and the specular reflector 20 may be provided to fix the specular reflector 20 at a known distance, for example. Moreover, in the present embodiment, a marker 200 may be provided on the mirror surface to measure the distance and posture of the specular reflector 20. Note that details of the fixing member 806 and the marker 200 will be described below.

Furthermore, in a case where a mirror or the like is installed in advance as the specular reflector 20 on a wall 840 (see FIG. 13) of a space where measurement is performed, the specular reflector 20 may not be included in the distance measuring system 1 according to the present embodiment.

(Processing Device 30)

The processing device 30 is a device that calculates the distance and shape of the object 50 on the basis of a phase difference detected by the distance measuring camera 10. The processing device 30 is a terminal such as a personal computer (PC), a tablet PC, or a personal digital assistant (PDA), for example, and an application for implementing the present embodiment is mounted therein. As illustrated in FIG. 1, the processing device 30 is connected with the distance measuring camera 10 via a communication cable 60 to receive sensing data from the distance measuring camera 10. Note that, in the present embodiment, connection between the processing device 30 and the distance measuring camera 10 is not limited to the wired connection as illustrated in FIG. 1, and may be connection via wireless communication.

Furthermore, in the present embodiment, the processing in the processing device 30 may be performed by the distance measuring camera 10, in other words, the processing may be performed by the distance measuring camera 10 in a stand-alone manner. Furthermore, for example, the processing device 30 according to the present embodiment may be a system including a plurality of devices on the premise of connection to a network such as cloud computing.

2. Background Leading to Creation of Embodiment According to Present Disclosure by Inventors Next, before describing details of an embodiment according to the present disclosure, the background leading to creation of the embodiment according to the present disclosure by the inventors will be described with reference to FIGS. 2 to 5. FIGS. 2 to 5 are explanatory diagrams for describing measurement of the object 50 using the specular reflector 20 according to the present embodiment.

For example, in a case where a region (for example, a back surface of the object 50) that cannot be measured by one distance measuring camera 10 is present in the object 50 to be measured by the distance measuring camera 10, a plurality of the distance measuring cameras 10 is required. For example, Patent Document 1 discloses a method of measuring the back surface or the like of the object 50 using a plurality of the distance measuring cameras 10 as described above. According to this method, since a plurality of the distance measuring cameras 10 is required, suppression of an increase in cost for constructing the distance measuring system 1 is difficult. Furthermore, in a case of combining images including distance information obtained by the plurality of distance measuring cameras 10 to obtain a three-dimensional image, pieces of point group information acquired by the distance measuring cameras 10 need to be appropriately aligned. Therefore, parts of the region measured by the plurality of distance measuring cameras 10 are required to overlap one another. As a result, there is a restriction on installation positions of the distance measuring cameras 10 in the technology disclosed in Patent Document 1, and thus measurement of the object 50 while following the freely moving object 50 is not easy. Furthermore, in the technology disclosed in Patent Document 1, the plurality of distance measuring cameras 10 needs to be synchronized with one another to avoid an interference among the distance measuring cameras 10.

To suppress the increase in cost, it is conceivable that one distance measuring camera 10 moves around the object 50 and measures the object 50, or the object 50 itself is rotated and measured. In such a case, the measurement takes time, and furthermore, a case where the object 50 dynamically changes over time (for example, the object 50 changes in shape over time) cannot be coped with.

Figure 2:
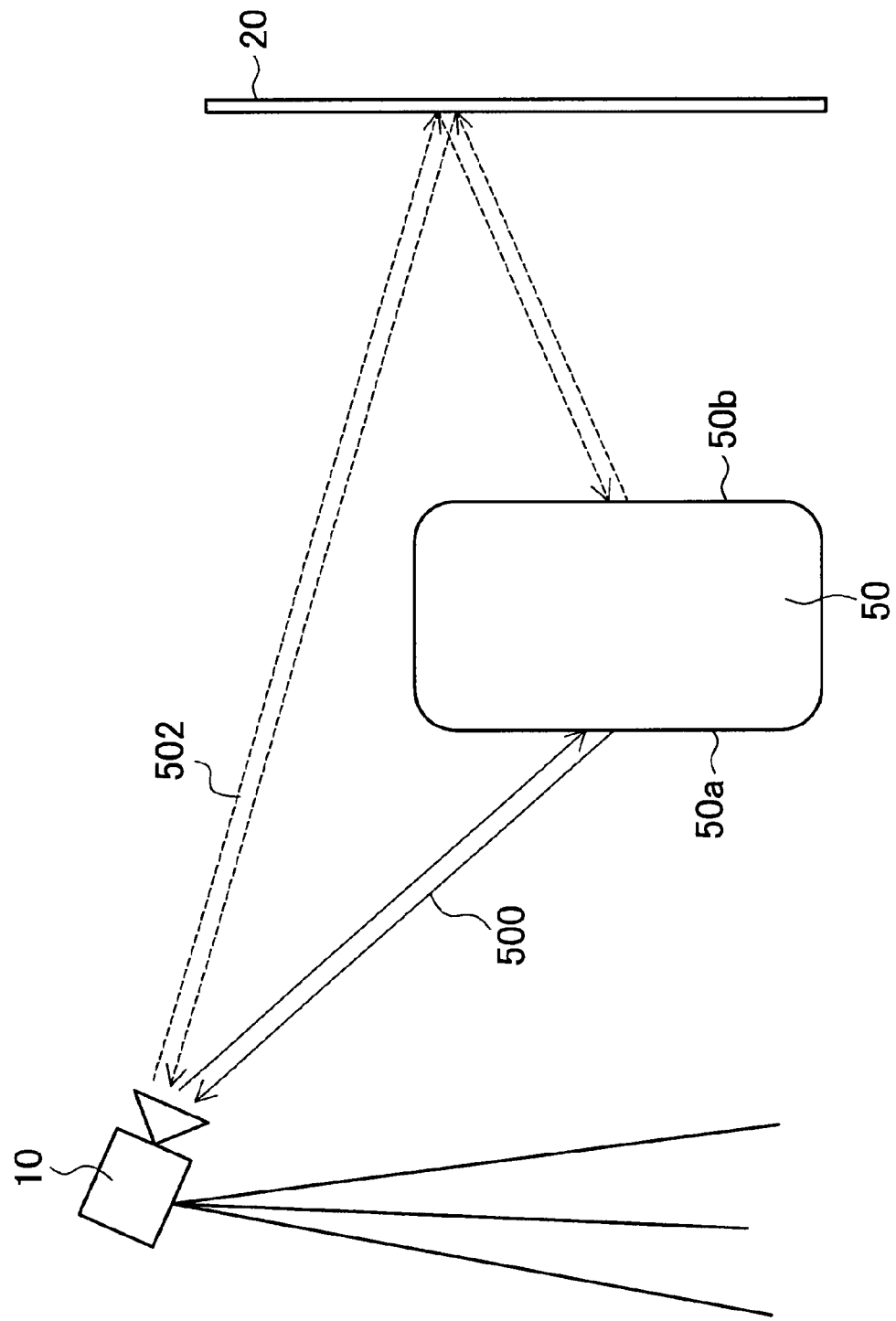
FIG. 2 is an explanatory diagram (part 1) for describing measurement of an object 50 using a specular reflector 20 according to the embodiment.

Furthermore, it is conceivable to measure the region that cannot be measured by the distance measuring camera 10, using one distance measuring camera 10 and the specular reflector 20 in combination. As such a method, the technology disclosed in Patent Document 2 can be cited. Specifically, as illustrated in FIG. 2, which is a diagram of FIG. 1 viewed from a side surface side, the specular reflector 20 is installed to be perpendicular to the floor surface, and the object 50 is installed between the distance measuring camera 10 and the specular reflector 20. At this time, an optical axis of the distance measuring camera 10 faces a right direction in FIG. 2. Then, the distance measuring camera 10 irradiates the object 50 with light. A part of the emitted light reaches a front surface 50a (the left-side surface in FIG. 2) of the object 50, is reflected by the front surface 50a, and is received by the distance measuring camera 10. Note that, in the following description, such a light path is referred to as a first path 500. Meanwhile, another part of the emitted light reaches the specular reflector 20, is reflected by the specular reflector 20, and reaches a back surface 50b (the right-side surface in FIG. 2) of the object 50. Moreover, after the light is reflected by the back surface 50b of the object 50, the light reaches the specular reflector 20 again and is reflected by the specular reflector 20, and is received by the distance measuring camera 10. Note that, in the following description, such a light path is referred to as a second path 502. Such a second path is uniquely determined because the light is specularly reflected.

Therefore, in the case of measuring the distance of the back surface 50b of the object 50, the distance measuring camera 10 measures the distance from the distance measuring camera 10, reflected by the specular reflector 20, and reaching the object 50, instead of the distance from the distance measuring camera 10 to the specular reflector 20.

Figure 3:
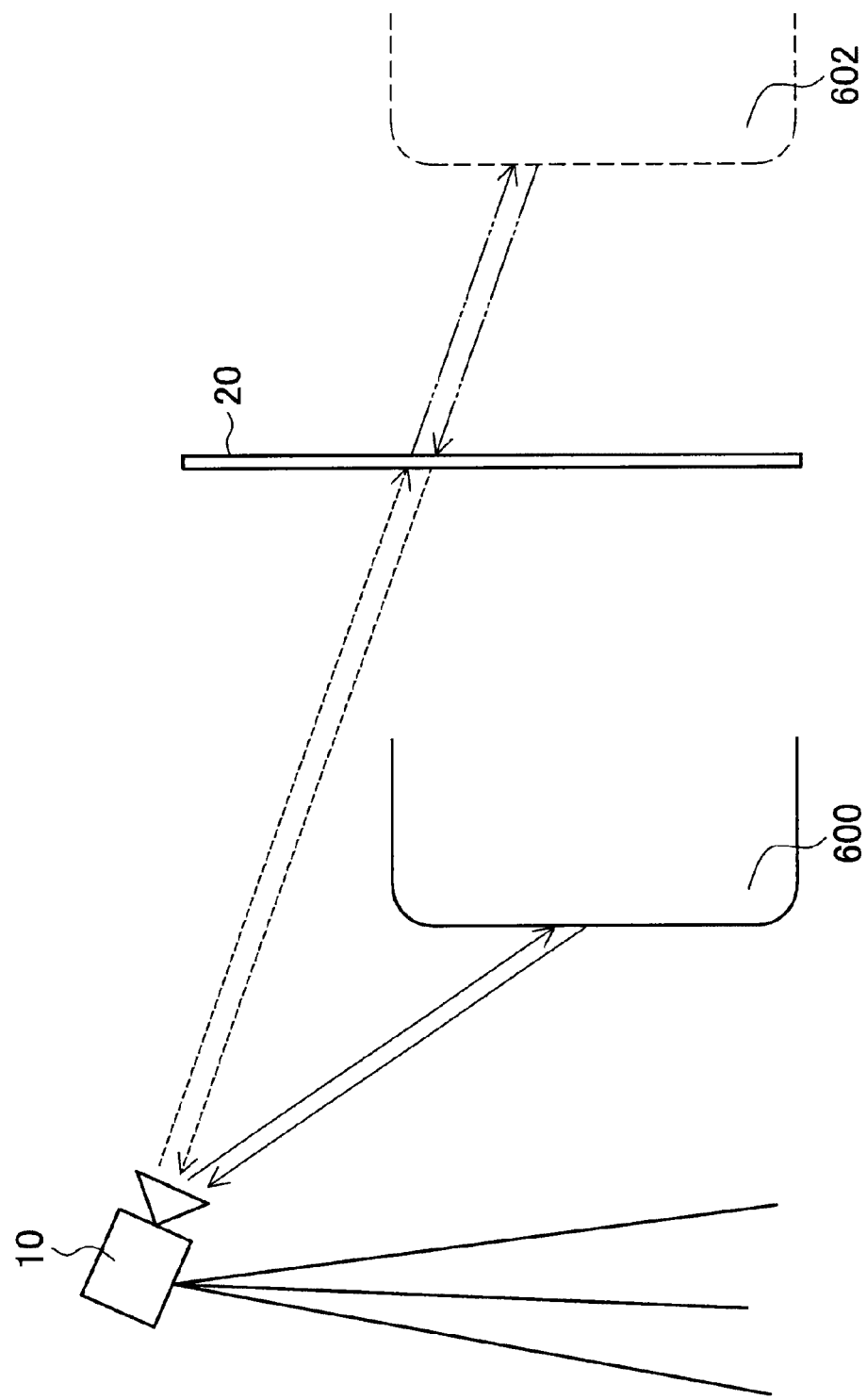
FIG. 3 is an explanatory diagram (part 2) for describing the measurement of the object 50 using the specular reflector 20 according to the embodiment.

Then, an image of the back surface 50b of the object 50 measured with the light in the second path is measured as if existing beyond the specular reflector 20 by the distance measuring camera 10, as illustrated in FIG. 3. Note that, in the following description, an image observed as if existing beyond the specular reflector 20 is called mirror image 602. Furthermore, in the following description, an image observed to exist on a front side of the specular reflector 20, such as the front surface 50a of the object 50, is called real image 600.

In other words, the above-described real image 600 and mirror image 602 have a mirrored relationship. At this time, if the position and posture of the specular reflector 20 are known as viewed from the distance measuring camera 10, the mirror image 602 is inverted with respect to a plane of the specular reflector 20 as illustrated in FIG. 4 to match the real image 600, whereby a three-dimensional image of the object 50 can be obtained.

Figure 5:
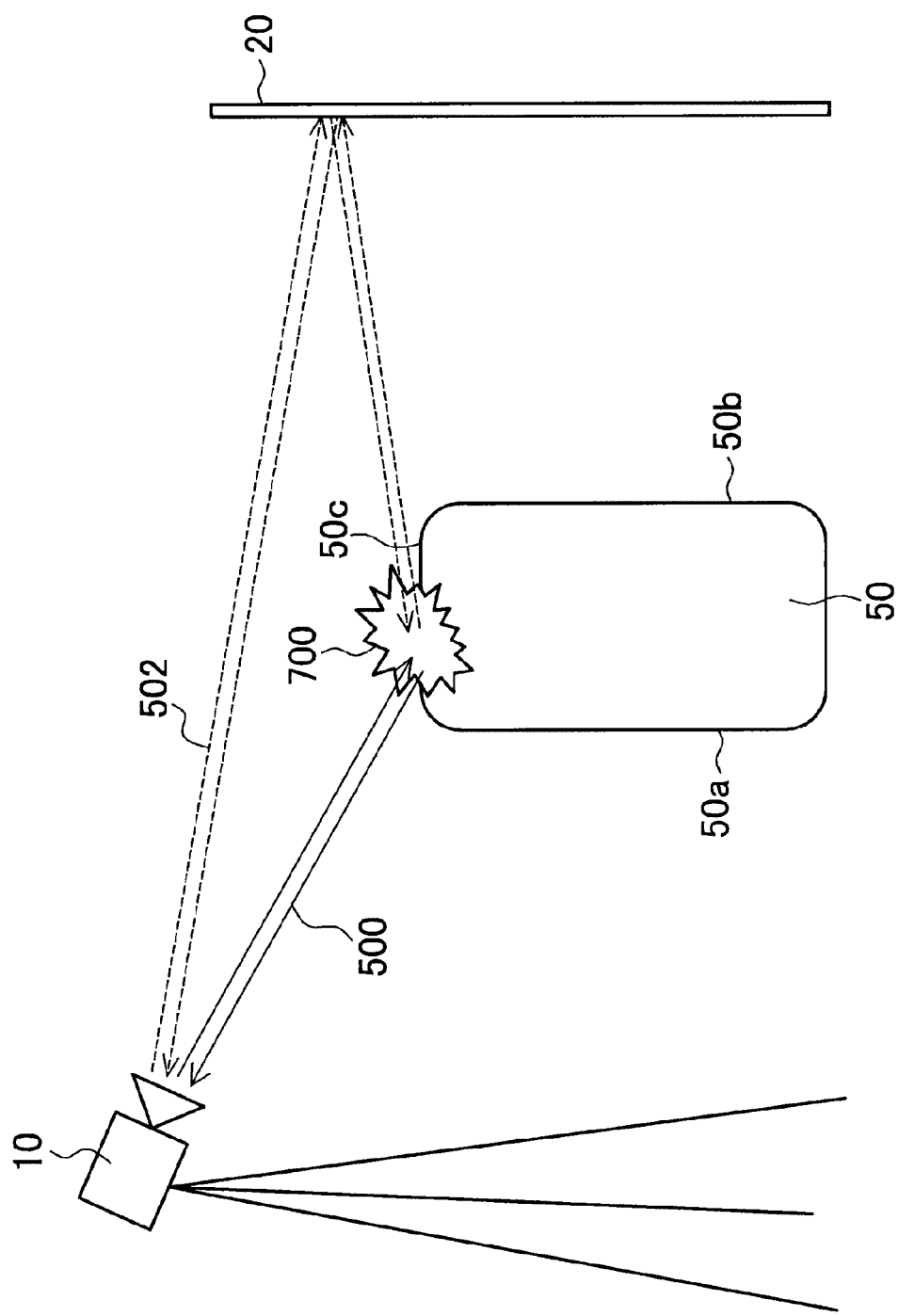
FIG. 5 is an explanatory diagram (part 4) for describing the measurement of the object 50 using the specular reflector 20 according to the embodiment.

By the way, as illustrated in FIG. 5, there may be a surface that both the light in the first path 500 and the light in the second path 502 arrive at and by which both the light in the first path 500 and the light in the second path 502 are reflected, depending on the shape of the object 50, like an upper surface 50c of the object 50. The light in the first path 500 and the light in the second path 502 are different from each other in phase because the lengths of the paths are different from each other, and the light in the first path 500 and the light in the second path 502 causes an interference 700 on the upper surface 50c of the object 50 or the like. As a result, the distance measuring camera 10 receives the interference light caused in this way. Therefore, the light received by the distance measuring camera 10 has a phase different from a phase to be originally received due to the interference 700. As a result, an error (distortion) occurs in the measured distance, and a correct distance to be originally measured cannot be obtained. Note that, in the following description, such a phenomenon is called interference 700 due to multipath. In other words, in the following description, the interference 700 due to multipath refers to occurrence of the interference 700 by light in different paths from each other, and is a phenomenon caused by providing the specular reflector 20, although it depends on the shape of the object 50.

However, as described above, since the technology disclosed in Patent Document 2 does not measure the object in consideration of the interference 700 due to multipath described above, it is difficult to accurately measure the distance and shape of the object 50.

Therefore, in view of the foregoing, the present inventors have created the embodiment of the present disclosure for enabling accurate measurement of the distance and shape of a region of the object 50, which is difficult to directly measure by one distance measuring camera 10, due to blockage by the object 50 itself or the like. Specifically, according to the embodiment of the present disclosure described below, by providing the specular reflector 20, the distance and shape of the object 50 can be accurately measured even in a case where the interference 700 due to multipath occurs by providing the specular reflector 20. Hereinafter, details of the embodiment of the present disclosure will be sequentially described in detail.

3. Details of Each Device Included in Distance Measuring System 1 According to Embodiment of Present Disclosure Next, details of each device included in the distance measuring system 1 according to the embodiment of the present disclosure will be described. Specifically, as described above, the distance measuring system 1 according to the present embodiment includes the distance measuring camera 10, the specular reflector 20, and the processing device 30. Hereinafter, details of the distance measuring camera 10 and the processing device 30 according to the present embodiment will be described.

<3.1 Detailed Configuration of Distance Measuring Camera 10>

Figure 6:
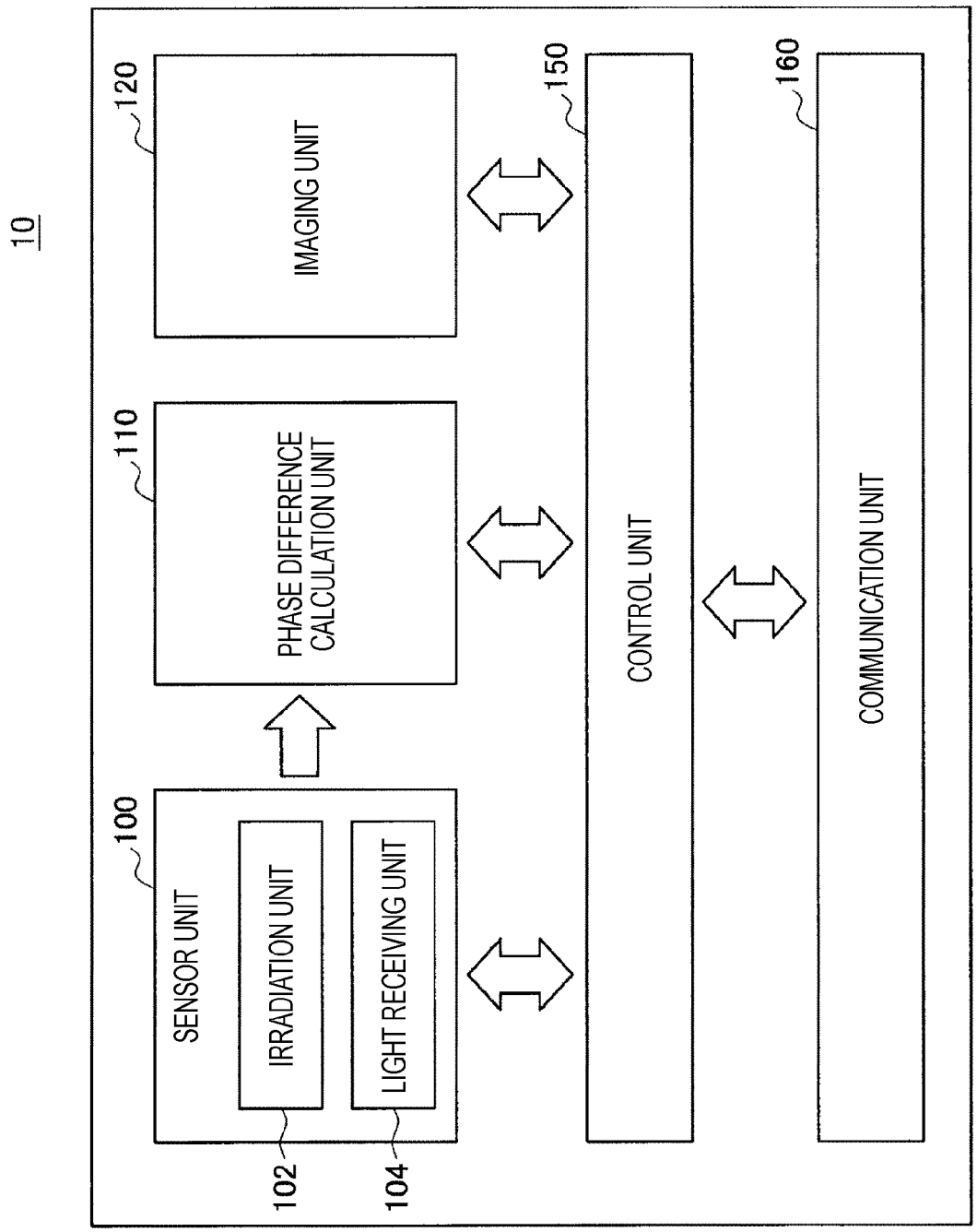
FIG. 6 is a block diagram illustrating a configuration of a distance measuring camera 10 according to the embodiment.

First, a detailed configuration of the distance measuring camera 10 will be described with reference to FIG. 6. FIG. 6 is a block diagram illustrating a configuration of the distance measuring camera 10 according to the present embodiment. As illustrated in FIG. 6, the distance measuring camera 10 mainly includes a sensor unit 100, a phase difference calculation unit 110, an imaging unit (color sensor unit) 120, a control unit 150, and a communication unit 160. Hereinafter, details of each functional unit of the distance measuring camera 10 will be described.

(Sensor Unit 100)

The sensor unit 100 mainly includes an irradiation unit 102 that irradiates the object 50 with light and a light receiving unit 104 that receives (detects) reflected light.

Specifically, the irradiation unit 102 includes a laser light source (not illustrated), an optical element (not illustrated), and a photoelectric element (not illustrated). For example, a laser diode is used as the laser light source, and the wavelength of emitted light can be changed by appropriately selecting the laser diode. Note that, in the present embodiment, description will be given on the assumption that the irradiation unit 102 emits infrared light having a wavelength of about 785 nm. Furthermore, a plurality of the laser light sources may be provided in the irradiation unit 102. Furthermore, the optical element has a collimator lens and the like, for example, and has a function to emit light from the laser light source as approximately parallel light. Furthermore, a light receiving element includes a complementary metal oxide semiconductor (CMOS) image sensor and the like, for example, receives a part of emitted light, and generates a reception light signal on the basis of the intensity of the received light, specifically, a signal approximately proportional to the intensity of the received light. Then, the light receiving element outputs the generated signal to the phase difference calculation unit 110 described below.

Note that the laser light source is driven by the control unit 150 described below, and irradiates the object 50 with light. Moreover, the intensity of the light emitted from the laser light source is also controlled by the control unit 150 described below. Furthermore, the irradiation unit 102 may include a light projection mirror (not illustrated), and the like.

The light receiving unit 104 includes a condenser lens (not illustrated) and a light receiving element (not illustrated). The condenser lens has a function to collect the received light to the light receiving element. Furthermore, for example, the light receiving element includes a CMOS image sensor having a plurality of pixels and the like, and generates a reception light signal on the basis of the intensity of the received light, specifically, a signal proportional to the intensity of the received light. Therefore, the distance measuring camera 10 can acquire the intensity of light corresponding to each pixel. Moreover, the light receiving element outputs the generated signal to the phase difference calculation unit 110 described below. At this time, the light receiving unit 104 may be provided with an amplification amplifier (not illustrated) or the like, and may output the generated signal to the phase difference calculation unit 110 after amplifying the signal. Note that the light receiving unit 104 may include a light collecting unit (not illustrated) and the like.

(Phase Difference Calculation Unit 110)

The phase difference calculation unit 110 calculates a phase difference between signals output from the irradiation unit 102 and the light receiving unit 104, in other words, a phase difference between the light emitted from the irradiation unit 102 and the light received by the light receiving unit 104, and outputs the calculated phase difference (sensing data) to the processing device 30 described below. Note that the function of the phase difference calculation unit 110 may be performed by the processing device 30 described below.

(Imaging Unit 120)

The imaging unit 120 acquires a color captured image of the object 50. Specifically, the imaging unit 120 includes an imaging element (not illustrated) such as a CMOS image sensor and a signal processing circuit (not illustrated) that applies imaging signal processing to a signal photoelectrically converted by the imaging element. The above-described imaging element converts incident light from the object 50 as an optical image, and the above-described signal processing circuit photoelectrically converts the focused optical image in units of pixels, reads the signal of each pixel as an imaging signal, processes the image, thereby acquiring the captured image. For example, the imaging unit 120 outputs the captured image obtained by imaging to the processing device 30. Moreover, the imaging unit 120 includes an optical system mechanism (not illustrated) configured by an imaging lens, a diaphragm mechanism, a zoom lens, a focus lens, and the like, and a drive system mechanism (not illustrated) that controls the operation of the optical system mechanism. Note that the imaging unit 120 may be provided separately from the distance measuring camera 10 as long as the relative position and posture of the distance measuring camera 10 with respect to the sensor unit 100 are known.

(Control Unit 150)

The control unit 150 is, for example, implemented by hardware such as a central processing unit (CPU), a read only memory (ROM), and a random access memory (RAM), and controls the functional units of the distance measuring camera 10.

(Communication Unit 160)

The communication unit 160 is a communication interface having a function to transmit/receive data, and can transmit/receive information to/from an external device such as the processing device 30. The communication unit 160 is implemented by a communication port, a communication antenna, and a communication device such as a transmission/reception circuit.

Note that the distance measuring camera 10 may further include a specular reflector sensor unit (not illustrated) that measures the distance and posture of the specular reflector 20 using ultrasonic waves or the like.

<3.2 Detailed Configuration of Processing Device 30>

Figure 7:
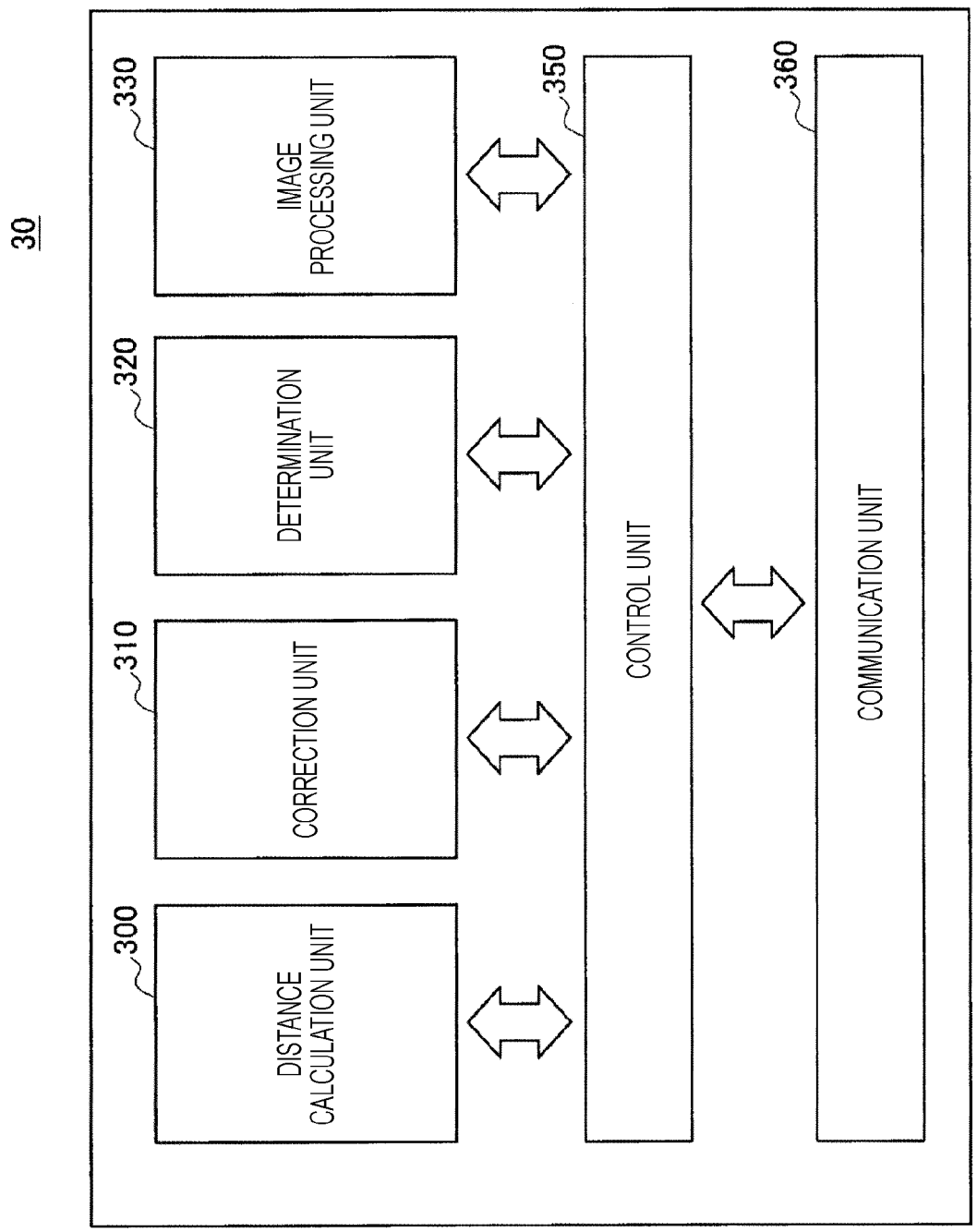
FIG. 7 is a block diagram illustrating a configuration of a processing device 30 according to the embodiment.

Next, a detailed configuration of the processing device 30 will be described with reference to FIG. 7. FIG. 7 is a block diagram illustrating a configuration of the processing device 30 according to the present embodiment. As illustrated in FIG. 7, the processing device 30 mainly includes a distance calculation unit 300, a correction unit 310, a determination unit 320, an image processing unit 330, a control unit 350, and a communication unit 360. Details of each functional unit of the processing device 30 will be described below.

(Distance Calculation Unit 300)

The distance calculation unit 300 calculates the distance from the distance measuring camera 10 to the object 50 on the basis of the phase difference output from the above-described distance measuring camera 10.

(Correction Unit 310)

The correction unit 310 corrects an error included in the calculated distance, the error being caused by the interference 700 (interference 700 due to multipath) between the light in the first path and the light in the second path. Note that details of the processing of the correction unit 310 will be described below.

(Determination Unit 320)

The determination unit 320 determines the presence or absence of occurrence of an error caused by the above-described interference 700 due to multipath. For example, the determination unit 320 determines the presence or absence of occurrence of an error according to the presence or absence of match between the mirror image 602 of the inverted object 50 and the real image 600 of the object 50. Note that details of the processing of the determination unit 320 will be described below.

(Image Processing Unit 330)

The image processing unit 330 acquires a three-dimensional point group of the object 50 on the basis of the distance information for each pixel (point) in the object 50 obtained by the above-described distance calculation unit 300. Furthermore, the image processing unit 330 can also perform inversion processing for a three-dimensional point group of the mirror image 602 of the object 50 on the basis of the position and posture of the specular reflector 20.

(Control Unit 350)

The control unit 350 is implemented by hardware such as a CPU, a ROM, and a RAM, for example, and controls each functional unit of the processing device 30.

(Communication Unit 360)

The communication unit 360 is a communication interface having a function to transmit/receive data, and can transmit/receive information to/from an external device such as the distance measuring camera 10. The communication unit 360 is implemented by a communication port, a communication antenna, and a communication device such as a transmission/reception circuit, similarly to the above-described communication unit 160.

4. Measurement Method According to Embodiment of Present Disclosure

Figure 8:
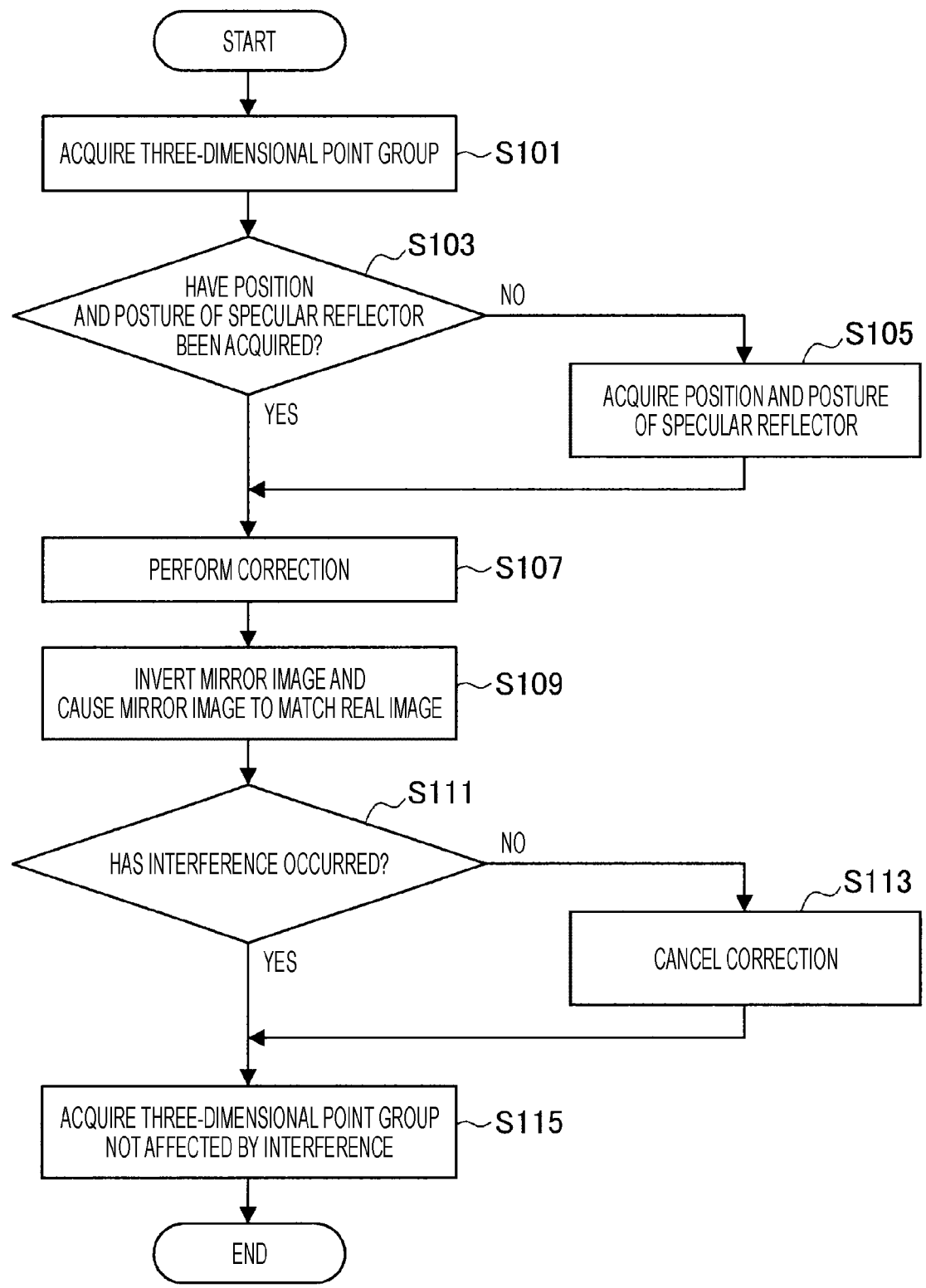
FIG. 8 is a flowchart for describing an example of a measurement method according to the embodiment.

The details of each device included in the distance measuring system 1 according to the embodiment of the present disclosure have been described above. Next, the measurement method according to the present embodiment will be described with reference to FIG. 8. FIG. 8 is a flowchart for describing an example of a measurement method according to the present embodiment. As illustrated in FIG. 8, the measurement method according to the present embodiment includes a plurality of steps from step S101 to step S115. Hereinafter, details of each step included in the measurement method according to the present embodiment will be described.

(Step S101)

First, the processing device 30 acquires the three-dimensional point group including coordinate information and distance information of each point of the object 50 calculated on the basis of the sensing data from the distance measuring camera 10.

(Step S103)

Next, the processing device 30 confirms whether or not information of the position and posture of the specular reflector 20 viewed from the distance measuring camera 10 has already been acquired. The processing device 30 proceeds to step S105 in a case where the information has not already been acquired, and the processing device 30 proceeds to step S107 in a case where the information has already been acquired.

(Step S105)

The processing device 30 acquires the information of the position and posture of the specular reflector 20 viewed from the distance measuring camera 10. For example, the distance measuring camera 10 measures the position and posture of the specular reflector 20, and the processing device 30 acquires the measurement result. Note that details of the measurement of the position and posture of the specular reflector 20 will be described below.

(Step S107)

Next, the processing device 30 corrects the error caused by the interference 700 due to multipath caused by providing the specular reflector 20, and acquires the three-dimensional point group of the object 50 to which the correction has been applied. Note that details of the correction will be described below.

(Step S109)

The processing device 30 inverts the three-dimensional point group of the mirror image 602 to which the correction has been applied in step S107 with respect to the plane of the specular reflector 20 to cause the inverted mirror image 602 to match the three-dimensional point group of the real image 600 to which the correction has been applied. Note that, in inverting the mirror image 602, the information of the position and posture of the specular reflector 20 acquired in step S105 is used.

(Step S111)

The processing device 30 determines the presence or absence of the interference 700 due to multipath, for each region (point) of the object 50, on the basis of the presence or absence of match between the real image 600 and the mirror image 602 in step S109. The processing device 30 proceeds to step S113 in a case where no occurrence of the interference 700 is determined, and the processing device 30 proceeds to step S115 in a case where occurrence of the interference 700 is determined. Note that details of the determination of the presence or absence of the interference 700 due to multipath will be described below.

(Step S113)

The processing device 30 cancels the correction performed in step S107, and acquires a three-dimensional point group to which correction is not applied.

(Step S115)

The processing device 30 performs the above-described series of steps for all of regions (points) of the object 50, finally acquires a three-dimensional point group of the object 50 not affected by the interference 700 due to multipath, and outputs the three-dimensional point group to the user, or the like, for example. Note that the correction has been made according to the presence or absence of the interference 700 due to multipath or the correction has not been made in the three-dimensional point group acquired at this time. Therefore, the real image 600 of the object 50 matches the inverted mirror image 602. In the past, there have been cases where, in the alignment of the real image 600 with the inverted mirror image 602, the alignment is required after a gap is eliminated by an input operation of the user. In the present embodiment, such an input operation is not necessary. Furthermore, in the past, there have been cases where, in the alignment of the real image 600 with the inverted mirror image 602, a common region commonly observed in both the real image 600 and the mirror image 602 is provided, and the alignment based on the common region is required. In the present embodiment, such an operation is not necessary.

Note that, in the measurement method illustrated in FIG. 8, the presence or absence of interference is determined according to the coincidence of the corrected real image 600 and the mirror image 602. However, the present embodiment is not limited to this method. For example, in the present embodiment, the presence or absence of the interference may be determined according to the match between the real image 600 before correction and the mirror image 602, and whether or not to perform the correction may be selected on the basis of the determination result.

Hereinafter, details of the measurement of the position and posture of the specular reflector 20 in step S105, details of the correction in step S107, and details of the determination of the presence or absence of the error in step S111 will be described in order.

<4.1 Measurement of Specular Reflector>

Figure 9:
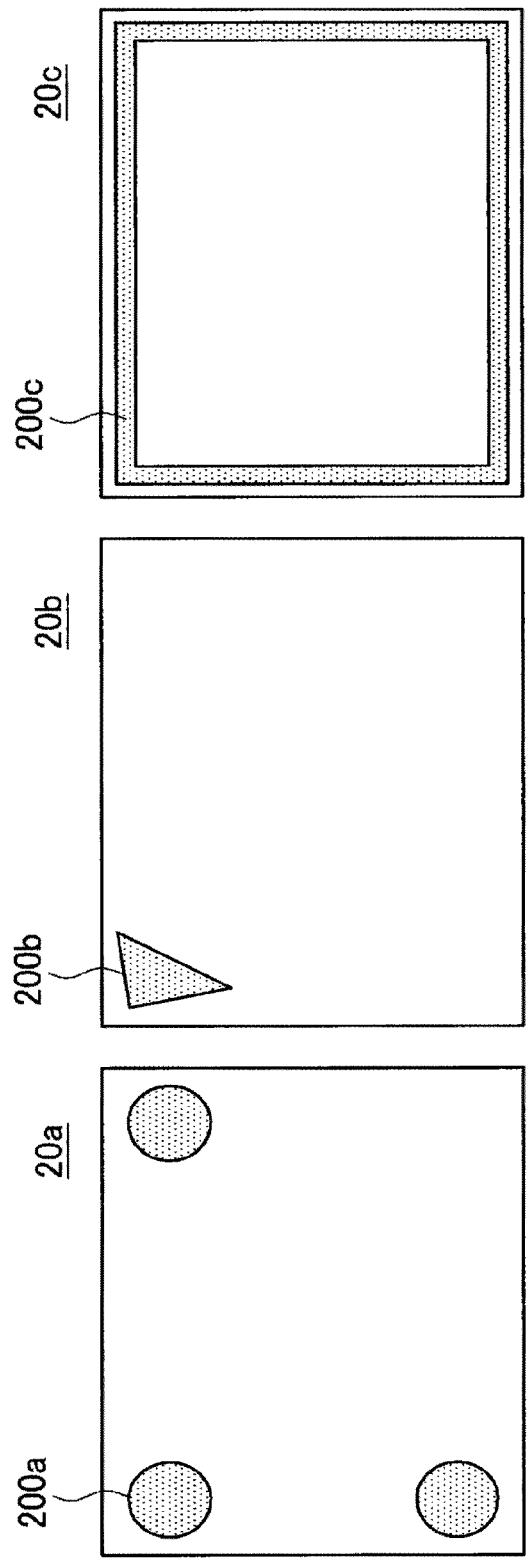
FIG. 9 is an explanatory diagram for describing an example of a method of measuring the specular reflector 20 according to the embodiment.

First, details of the measurement of the position and posture of the specular reflector 20 in step S105 will be described with reference to FIG. 9. FIG. 9 is an explanatory diagram for describing an example of a method of measuring the specular reflector 20 according to the present embodiment.

By the way, since specular reflection is caused on a mirror surface of the specular reflector 20, incident light entering the specular reflector 20 and reflection light reflected by the specular reflector 20 do not follow the same path. Therefore, the distance measuring camera 10 cannot directly measure the distance to the specular reflector 20. Therefore, in the present embodiment, for example, the marker 200 having a less glossy surface is attached to the mirror surface of the specular reflector 20. Then, since the specular reflection does not occur on the surface of such a marker 200, the distance measuring camera 10 can measure the distance to the marker 200, and can therefore measure the position and posture of the specular reflector 20. Note that a method of detecting the marker 200 at this time may be manually selected by the user for a captured image of the marker 200. When the shape of the marker 200 is known, the distance measuring camera 10 may automatically detect the method on the basis of the shape, and is not particularly limited.

Specifically, as illustrated on the left side in FIG. 9, markers 200a having a non-glossy surface are attached along four corners of a surface of a specular reflector 20a. In this case, the position and posture of the specular reflector 20a can be measured by measuring four markers 200a. Note that, as illustrated on the left side in FIG. 9, the marker 200a is not limited to a circular shape and the number of the markers 200a is not limited to four. For example, in the present embodiment, the marker 200 may include three or more markers (marker portions) provided spaced from one another.

Furthermore, in the present embodiment, a marker 200b may be a triangle, as illustrated in the center in FIG. 9. In this case, the position and posture of the specular reflector 20b can be measured by measuring vertexes of the marker 200b. Moreover, in the present embodiment, a marker 200c may have a frame-like shape along four corners of a plane of a specular reflector 20c, as illustrated on the right side in FIG. 9. In this case, the position and posture of the specular reflector 20c can be measured by measuring vertexes of the marker 200c.

Furthermore, in the present embodiment, the measurement method is not limited to the above-described method using the marker 200 as long as the position and posture of the specular reflector 20 can be measured by the measurement method. For example, according to the present embodiment, the position and posture of the specular reflector 20 may be measured by providing a specular reflector measurement unit (specular reflector sensor unit) that emits ultrasonic waves from the distance measuring camera 10 toward the specular reflector 20. Furthermore, according to the present embodiment, the position and posture of the specular reflector 20 may be measured by a motion capture method using a captured image of the specular reflector 20, and the measurement method is not particularly limited. Note that, in the present embodiment, the specular reflector 20 and the distance measuring camera 10 are fixed. When relative relationship between the position and posture is known, the above-described marker 200, specular reflector measurement unit, and the like are not necessary.

In the present embodiment, it is only required that a relative positional relationship between the distance measuring camera 10 and the specular reflector 20 is known for each imaging frame. Therefore, in the present embodiment, in a case where the relative positional relationship between the distance measuring camera 10 and the specular reflector 20 dynamically changes, it is only required that the relative positional relationship between the distance measuring camera 10 and the specular reflector 20 is acquired using the above-described method for each imaging frame.

<4.2 Correction of Error Due to Multipath Interference>

Figure 10:
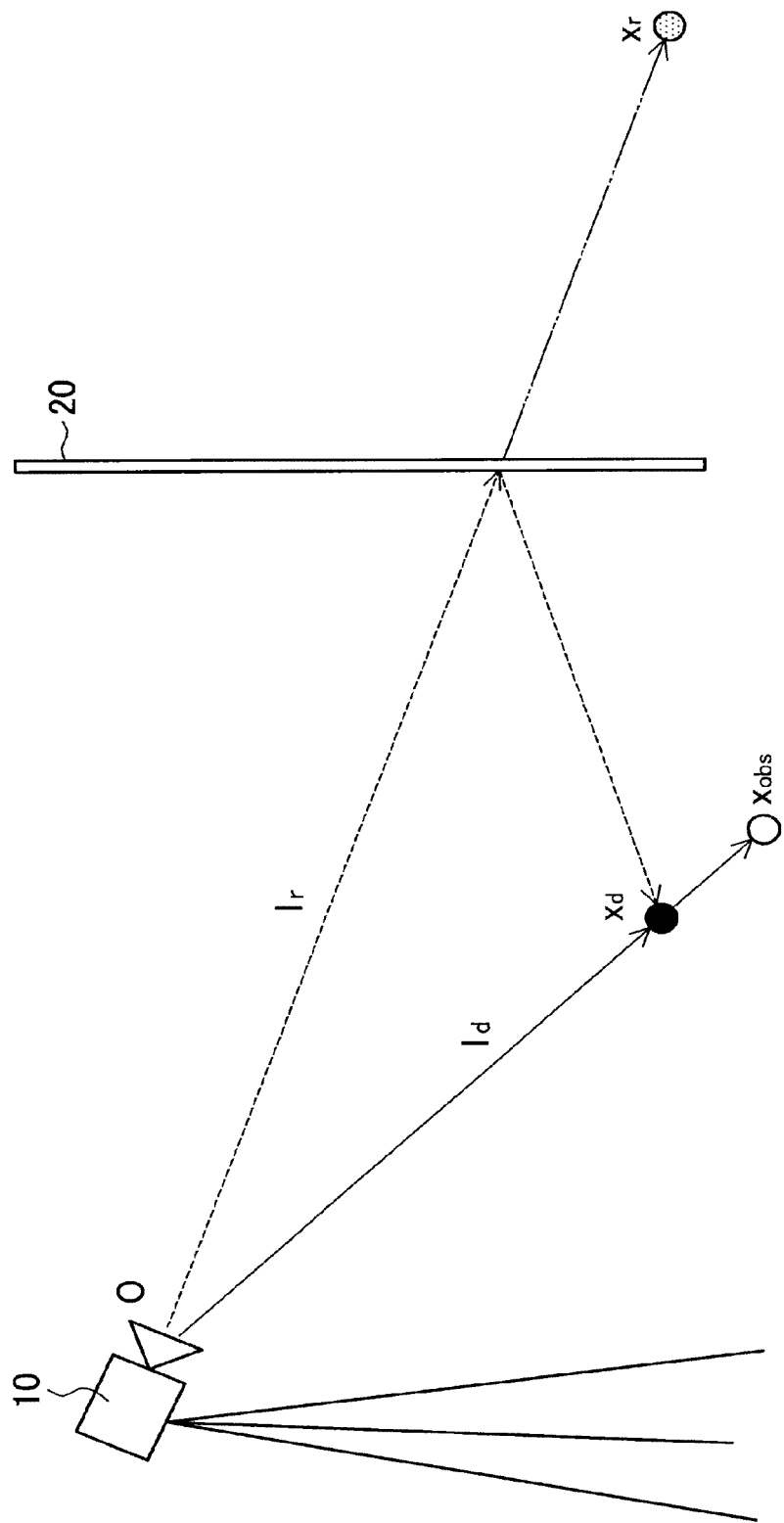
FIG. 10 is an explanatory diagram for describing an example of a correction method according to the embodiment.

Next, details of the correction in step S107 will be described with reference to FIG. 10. FIG. 10 is an explanatory diagram for describing an example of a correction method according to the present embodiment. In detail, FIG. 10 schematically illustrates a positional relationship among a camera center O of the distance measuring camera 10, the specular reflector 20, a position $x_d$ of the object 50 to be originally measured by the distance measuring camera 10 (a position of the object 50 to be measured in a case of being not affected by the interference 700 due to multipath), and an observed position $x_d$ of the object 50 including an error caused by the interference 700 due to multipath.

As described above, the light in the first path 500 and the light in the second path 502 cause the interference 700 on the upper surface 50c of the object 50 or the like (interference 700 due to multipath) depending on the shape of the object 50, and the distance measuring camera 10 receives the light having a different phase from a phase to be originally measured. As a result, an error (distortion) occurs in the measured distance, and a correct distance of the object 50 cannot be obtained. Therefore, in the present embodiment, a correction of the error caused by the interference 700 due to multipath caused by installing the specular reflector 20 is performed, and the correct distance of the object 50 is acquired.

Specifically, in the present embodiment, a phase estimated to be caused in the case of being affected by the interference 700 due to multipath by installing the specular reflector 20, in other words, a phase to be measured by the distance measuring camera 10 is expressed by a model (estimation value) to be described. Then, in the present embodiment, by minimizing a difference between the phase estimated by the model and an actually measured phase, the phase to be originally measured by the distance measuring camera 10 in other words, a phase not affected by the interference 700 due to multipath is estimated. Furthermore, in the present embodiment, the error is corrected on the basis of the estimation, and the distance of the object 50 is calculated.

First, in the present embodiment, the model for estimating the phase obtained in the case where the light in the first path 500 and the light in the second path 502 interfere, in other words, in the case where the interference occurs due to multipath will be described with reference to FIG. 10.

In the present embodiment, since the light in the first path 500 and the light in the second path 502 are emitted from the same distance measuring camera 10, the light in the first path 500 and the light in the second path 502 are considered to have the same frequency. Therefore, interference light obtained in the case where an interference occurs due to multipath can be considered to be a combined wave of waveforms having the same frequency and having different phases and amplitudes. Therefore, a phase $P_i$ of the interference light at the point $x_d$ is expressed by the following expression (1) in a case where the phase of the light in the first path 500 is $P_d$ and the phase of the light in the second path 502 is $P_r$ at the point of time when the light is emitted from the distance measuring camera 10 and reaches the point xd on the surface of the object 50. Note that $P_d$ and $P_r$ are one-way phases and are ideal phases not affected by the interference 700 due to multipath caused by the specular reflector 20. Furthermore, in the expression (1) below, the amplitude of the light in the first path 500 and the amplitude of the light in the second path 502 at the point $x_d$ of the object 50 where the light in the first path 500 and the light in the second path 502 interfere are $power_d$ and $power_r$, respectively.

[Math. 1]

$$P_i = \tan^{-1}\left(\frac{power_d \sin(P_d) + power_r \sin(P_r)}{power_d \cos(P_d) + power_r \cos(P_r)}\right) \quad (1)$$

Next, a relationship among the phases $P_d$ and $P_r$, a one-way path length $l_d$ of the first path 500, and a one-way length $l_r$ of the second path 502 is expressed by the following expression (2). Note that, in the expression (2), f represents the frequency of the light emitted by the distance measuring camera 10, and c represents a light speed.

[Math. 2]

$$P_d = \frac{2\pi f l_d}{c}, P_r = \frac{2\pi f l_r}{c} \quad (2)$$

By the way, in practice, at the point of time when the light in the first path 500 and the light in the second path 502 interfere, the path lengths $l_d$ and $l_r$ followed by the light in the first path 500 and the light in the second path 502 are different. Therefore, since the amplitude (power) of light at a certain point is inversely proportional to the square of the distance from the light source to the point according to the inverse square law, the amplitude of the light in the first path 500 and the amplitude of the light in the second path 502 are different from each other. Moreover, when assuming that the light is Lambert-reflected by the object 50, consideration of directions of incident light (the light in the first path 500 and the light in the second path 502) with respect to a direction of a normal vector at the point $x_d$ of the object 50 where the light in the first path 500 and the light in the second path 502 interfere is required.

Therefore, in a case where the amplitude of the light at the time of emission of the distance measuring camera 10 is 1, the amplitude $power_d$ of the light in the first path 500 and the amplitude $power_r$ of the light in the second path 502 at the point $x_d$ can be expressed by the following expression (3). Note that, in the expression (3), $\alpha_d$ and $\alpha_r$ represent angles at the point $x_d$ made by the normal vector and direction vectors of the light in the first path 500 and the light in the second path 502 having entered the point $x_d$. Furthermore, $r_m$ in the expression (3) represents the reflectance of the specular reflector 20, and is a constant in a range of $0 \leq r_m \leq 1$. The reflectance $r_m$ is different depending on the material of the reflecting surface of the specular reflector 20. Note that, in the present embodiment, the reflectance $r_m$ of the specular reflector 20 is known.

[Math. 3]

$$power_d = \frac{\cos\alpha_d}{(l_d)^2}, \quad power_r = \frac{r_m \cos\alpha_r}{(l_r)^2} \quad (3)$$

By the way, at the point $x_d$ of the object 50 where the light in the first path 500 and the light in the second path 502 interfere, the Lambert reflection has occurred in both the light in the first path 500 and the light in the second path 502. Therefore, $\cos\alpha_d$ and $\cos\alpha_r$ in the expression (3) are considered to be approximated to 1.

Therefore, the phase $P_i$ of the interference light at the point $x_d$ is expressed by the following expression (4) as a function of Pd and Pr by applying the expressions (2) and (3) to the above expression (1). Note that $A = c/2\pi f$ is established in the expression (4).

[Math. 4]

$$P_i = \tan^{-1}\left(\frac{\frac{\sin(P_d)}{(AP_d)^2} + \frac{rm\sin(P_r)}{(AP_r)^2}}{\frac{\cos(P_d)}{(AP_d)^2} + \frac{rm\cos(P_r)}{(AP_r)^2}}\right) \quad (4)$$

By using the model expressed by the above expression (4), the phase $P_i$ of the interference light at the point $x_d$ can be estimated.

By the way the interference light interfering at the point $x_d$ of the object 50 then reaches the distance measuring camera 10. At this time, in a case where the interference light follows a path similar to the first path 500, in other words, in a case where the interference light directly reaches the distance measuring camera 10 from the object 50, a phase $P_O$ of the light at the time when the light has reached the distance measuring camera 10 is further shifted by Pd. In other words, the phase $P_O$ of the light in the case where the interference light travels following the first path 500 is expressed by the following expression (5).

[Math. 5]

$$P_o = P_i + P_d \quad (5)$$
$$= \tan^{-1}\left(\frac{power_d \sin(P_d) + power_r \sin(P_r)}{power_d \cos(P_d) + power_r \cos(P_r)}\right) + P_d$$
$$= \tan^{-1}\left(\frac{\frac{\sin(P_d)}{(AP_d)^2} + \frac{rm\sin(P_r)}{(AP_r)^2}}{\frac{\cos(P_d)}{(AP_d)^2} + \frac{rm\cos(P_r)}{(AP_r)^2}}\right) + P_d$$

As described above, the phase $P_O$ of the light observed in the case where the interference 700 occurs due to multipath by installing the specular reflector 20 can be modeled by the expression (5).

Then, in the present embodiment, by minimizing a difference between the phase $P_O$ expressed by the model by the above expression (5) and an actually observed phase $P_{obs}$, the ideal phases $P_d$ and $P_r$ observed in the case where no interference 700 due to multipath occurs are obtained. Here, in practice, the phase including the error caused by the interference 700 due to multipath by installing the specular reflector 20 and observed by the distance measuring camera 10 is $P_{obs}$. Note that the phase $P_{obs}$ is so-called a one-way phase from the camera center O of the distance measuring camera 10 to the point $x_{obs}$, and the phase $P_o$ expressed by the expression (5) is a round-trip phase from the camera center O of the distance measuring camera 10 to the point $x_{obs}$. Therefore, a difference $f_1(P_d, P_r)$ between the phase $P_O$ expressed by the model by the above expression (5) and the actually observed phase $P_{obs}$ is expressed by the following expression (6).

[Math. 6]

$$f_1(P_d, P_r) = 2P_{obs} - P_o \quad (6)$$
$$= 2P_{obs} - (P_i + P_d)$$
$$= 2P_{obs} - \left[\tan^{-1}\left(\frac{power_d\sin(P_d) + power_r\sin(P_r)}{power_d\cos(P_d) + power_r\cos(P_r)}\right) + P_d\right]$$
$$= 2P_{obs} - \left[\tan^{-1}\left(\frac{\frac{\sin(P_d)}{(AP_d)^2} + \frac{rm\sin(P_r)}{(AP_r)^2}}{\frac{\cos(P_d)}{(AP_d)^2} + \frac{rm\cos(P_r)}{(AP_r)^2}}\right) + P_d\right]$$

Furthermore, similarly to the above description, when the interference light reaches the distance measuring camera 10, the phase is further shifted by Pr in a case where the interference light follows a path similar to the second path 502, in other words, in a case where the interference light reaches the distance measuring camera 10 from the object 50 via the specular reflector 20. In other words, a phase $P_p$ of the light in the case where the interference light travels following the second path 502 is expressed by the following expression (7). Note that, in this case, the object 50 is observed as if existing at a point $x_r$ as viewed from the distance measuring camera 10, in other words, as if the mirror image 602 exists at the point $x_r$.

[Math. 7]

$$P_p = P_i + P_d \quad (7)$$
$$= \tan^{-1}\left(\frac{power_d\sin(P_d) + power_r\sin(P_r)}{power_d\cos(P_d) + power_r\cos(P_r)}\right) + P_r$$
$$= \tan^{-1}\left(\frac{\frac{\sin(P_d)}{(AP_d)^2} + \frac{rm\sin(P_r)}{(AP_r)^2}}{\frac{\cos(P_d)}{(AP_d)^2} + \frac{rm\cos(P_r)}{(AP_r)^2}}\right) + P_r$$

Then, similarly to the above description, a difference $f_2(P_d, P_r)$ between the phase $P_p$ expressed by the model by the above expression (7) and the actually observed phase $P_{obs}$ is expressed by the following expression (8).

[Math. 8]

$$f_2(P_d, P_r) = 2P_{obs} - P_p \qquad (8)$$
$$= 2P_{obs} - (P_i + P_r)$$
$$= 2P_{obs} - \left[\tan^{-1}\left(\frac{power_d \sin(P_d) + power_r \sin(P_r)}{power_d \cos(P_d) + power_r \cos(P_r)}\right) + P_r\right]$$
$$= 2P_{obs} - \left[\tan^{-1}\left(\frac{\frac{\sin(P_d)}{(AP_d)^2} + \frac{rm\sin(P_r)}{(AP_r)^2}}{\frac{\cos(P_d)}{(AP_d)^2} + \frac{rm\cos(P_r)}{(AP_r)^2}}\right) + P_r\right]$$

Then, $P_d$ and $P_r$ can be obtained by minimizing the difference $f_1$ ($P_d$, $P_r$) and the difference $f_2$ ($P_d$, $P_r$) expressed by the above expressions (6) and (8), in other words, by comparing the phase $P_{obs}$ that is an actual measurement value with an estimation value of the phase estimated to be caused in the case of being affected by the interference 700 due to multipath. Note that, as can be seen from the above expression (2), the distances $l_d$ and $l_r$ from the camera center O of the distance measuring camera 10 to the point xd can be obtained from $P_d$ and $P_r$ when the frequency f of the light emitted from the distance measuring camera 10 and the light speed c are known. Then, by replacing the observed phase $P_{obs}$ with $P_d$ and $P_r$, the error caused by the interference 700 due to multipath can be corrected.

Furthermore, an expression of a straight light passing through the point $x_{obs}$ from the camera center O of the distance measuring camera 10 can be obtained from the information of the three-dimensional point group of the object 50 obtained from the distance measuring camera 10. By the way, the interference 700 due to multipath caused by installing the specular reflector 20 affects the observed phase, in other words, a distance value, and does not affect the direction in which the light travels. Furthermore, since the position and posture of the specular reflector 20 are known, the position of the point $x_r$ is uniquely determined when the position of the point $x_d$ is known. Specifically, the camera center O of the distance measuring camera 10, the point $x_d$, and the point $x_{obs}$ exist on the same straight line. Moreover, the point $x_r$ exists at a position symmetrical to the point $x_d$ with respect to the plane of the specular reflector 20. Therefore, by obtaining a point where the above expressions (6) and (8) are minimized while scanning the straight line from the camera center O toward the object 50, the position of the ideal observation point $x_d$, in other words, the distance $l_d$ can be obtained. Furthermore, since the position of the $x_r$ is determined on the basis of the point $x_d$, the distance $l_r$ from the camera center O to the point $x_r$ can be obtained.

<4.3 Determination of Presence or Absence of Occurrence of Multipath>

Next, details of the determination of the presence or absence of the error in step S111 will be sequentially described. By the way, as mentioned in the description of the occurrence of the interference 700 due to multipath, the interference 700 due to multipath may not occur depending on the shape of the object 50. Furthermore, even in the same object 50, a region where the interference 700 due to multipath occurs and a region where the interference 700 due to multipath does not occur coexist. In such a case, if the above-described correction is performed for all the points of observation data, the region where the interference 700 due to multipath has not occurred is excessively corrected. Therefore, there is a possibility that a three-dimensional point group significantly different from the actual object 50 is acquired. Therefore, in the present embodiment, whether or not the interference 700 due to multipath has occurred, specifically, the region where the interference 700 due to multipath occurs and the region where the interference 700 due to multipath does not occur are discriminated.

First, in the present embodiment, the above-described correction is performed for all the observed three-dimensional point groups including the real image 600 and the mirror image 602. Next, the mirror image 602 to which the correction has been applied is inverted with respect to the plane of the specular reflector 20, and the inverted mirror image 602 is caused to match the real image 600 to which the correction has been applied. At this time, in the case of the region where the interference 700 due to multipath has occurred, the positions and shapes of the inverted mirror image 602 and the real image 600 match. On the other hand, in the case of the region where the interference 700 due to multipath has not occurred, the positions and shapes of the inverted mirror image 602 and the real image 600 do not match due to the excessive correction.

In the present embodiment, all of camera parameters (focal length and the like) of the distance measuring camera 10 are assumed to be known. Therefore, the three-dimensional point group of the object 50 can be calculated from a distance image including a distance value of each pixel acquired by the distance measuring camera 10. In other words, since the each pixel and the three-dimensional point group included in the distance image correspond in a one-to-one basis, the three-dimensional point group can be projected on the two-dimensional distance image. Therefore, in the present embodiment, the three-dimensional point group obtained from the real image 600 of the object 50 and the three-dimensional point group obtained from the mirror image 602 are projected on the distance image. In projecting the three-dimensional point group of the inverted mirror image 602, there are cases where coordinates of each pixel are shifted and the pixel of the three-dimensional point group of the inverted mirror image 602 is not corresponding to a pixel of the three-dimensional point group of the real image projected on the same distance image. In such a case, each pixel in the three-dimensional point group of the inverted mirror image 602 is treated as a pixel corresponding to a pixel located in the vicinity. As a way of obtaining correspondence between the pixels, various storage methods such as nearest neighbor interpolation and bilinear interpolation can be selected, for example. In this way, in the present embodiment, the correspondence between the three-dimensional point group of the real image 600 and the three-dimensional point group of the inverted mirror image 602 is obtained.

At this time, application of the above-described correction is maintained, considering that appropriate correspondence is obtained when the distance between a point of the three-dimensional point group of the corresponding real image 600 and a point of the three-dimensional point group of the inverted mirror image 602 is less than a preset threshold. On the other hand, it is determined that appropriate correspondence is not obtained when the distance between a point of the three-dimensional point group of the corresponding real image 600 and a point of the three-dimensional point group of the inverted mirror image 602 is equal to or larger than the preset threshold. In this case, the correction is canceled, estimating that the correspondence cannot be obtained due to the excessive correction, in other words, considering that the interference 700 due to multipath has not occurred at the appropriate point, and the value is replaced with information obtained by adopting a value observed in the distance measuring camera 10 as it is.

In other words, according to the present embodiment, the region where the interference 700 due to multipath occurs and the region where the interference 700 due to multipath does not occur can be discriminated on the basis of the matching state between the three-dimensional point group of the real image 600 and the three-dimensional point group of the inverted mirror image 602.

Furthermore, in the present embodiment, a color image obtained by the imaging unit 120 of the distance measuring camera 10 may be used at the above-described discrimination. By doing so, the discrimination of the occurrence of the interference 700 due to multipath can be more easily and accurately performed.

Specifically, a relative positional relationship between the sensor unit 100 and the imaging unit 120 of the distance measuring camera 10 are assumed to be known, and camera parameters and the like of the sensor unit 100 and the imaging unit 120 are assumed to be known. At this time, the correspondence between each pixel of the distance image obtained by the sensor unit 100 and each pixel of the color image obtained by the imaging unit 120 can be specified. Therefore, in the present embodiment, the distance value and color information for each pixel can be acquired. Therefore, in the present embodiment, a color image of the real image 600 and a color image of the mirror image 602 are compared, and a region of the object 50 included in both the color images is specified. Since the region included in both the color images corresponds to both the real image 600 by the light in the first path 500 and the mirror image 602 by the light in the second path 502, a possibility that the region corresponds to the region where the interference 700 due to multipath has occurred is high. Therefore, in the present embodiment, by specifying such a region by the color images and further extracting a three-dimensional point group corresponding to pixels of the specified region, the region where the interference 700 due to multipath has occurred can be acquired. In other words, according to the present embodiment, by referring to the color images, the discrimination of the occurrence of the interference 700 due to multipath can be more easily and accurately performed. For example, in a case where discrimination leakage occurs when discriminating the region where the interference 700 due to multipath occurs according to the presence or absence of match between the real image 600 and the inverted mirror image 602, the discrimination using color images can be performed and supplemented. Therefore, discrimination without leakage with high accuracy can be performed.

Furthermore, in a case where characteristic point matching is performed in the real image 600 and the inverted mirror image 602, and matching points can be detected in both the images, the real image 600 and the inverted mirror image 602 may be estimated to match. At this time, the characteristic points do not necessarily match in all the pixels. Therefore, in such a case, in the present embodiment, region division by color segmentation is performed for the real image 600 and the inverted mirror image 602 on the basis of the color images acquired by the imaging unit 120. Then, the number of points where the characteristic points match is counted for each divided region, and a region where the number of matching points, the number being equal to or larger than a preset threshold, is included is estimated that the real image 600 and the inverted mirror image 602 match, and the region is discriminated as the region where the interference 700 due to multipath occurs. On the other hand, a region where the number of matching points, the number being less than the above-described threshold, is included is estimated that the real image 600 and the inverted mirror image 602 do not match, and the region is discriminated as the region where the interference 700 due to multipath has not occurred. Note that the region division is not limited to the color segmentation, and may be performed on the basis of texture or the like obtained from the image of the object 50.

In the present embodiment, the method of discriminating the region where the interference 700 due to multipath has occurred is not limited to the above-described method. For example, the region may be specified by designating a portion corresponding to the region where the interference 700 due to multipath has occurred from the color image of the object 50 or the like by the user. Furthermore, the region may be specified by designating a specific region from regions divided by the color segmentation by the user.

5. Applications of Embodiment of Present Disclosure

The details of the embodiment of the present disclosure have been described. Hereinafter, an example of the embodiment of the present disclosure will be described with specific applications. Note that applications to be described below are merely examples of the embodiment of the present disclosure, and the embodiment of the present disclosure is not limited to the applications below.

<5.1 Application 1>

Figure 11:
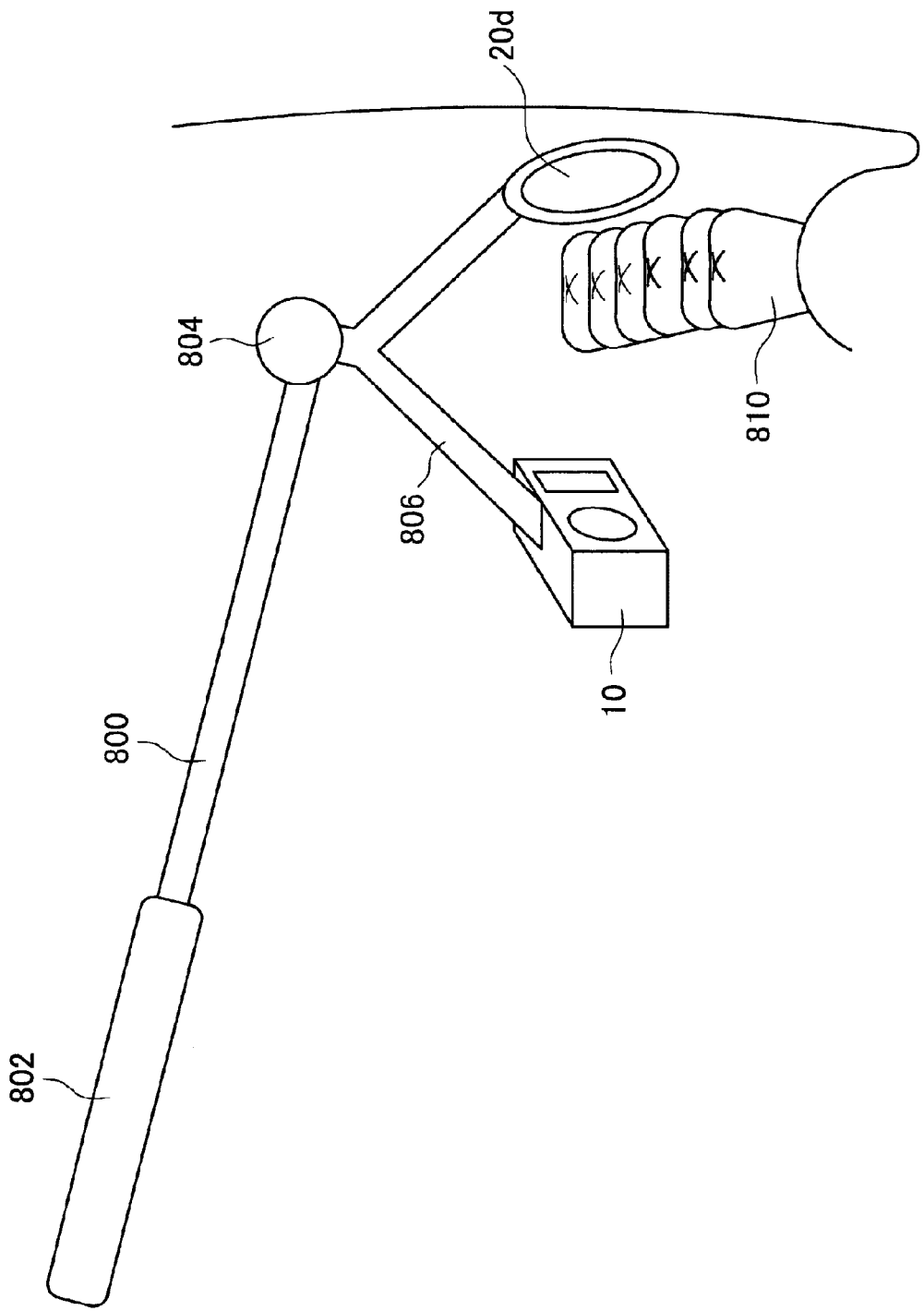
FIG. 11 is an explanatory diagram for describing an application 1 of the embodiment.

First, an application 1 of the embodiment of the present disclosure will be described with reference to FIG. 11. FIG. 11 is an explanatory diagram for describing an application 1 of the present embodiment, and specifically illustrates a state in which the shape of a dentition 810 in an oral cavity of a patient or the like is scanned using the present embodiment.

For example, in dental treatment, in a case of acquiring a denture mold of the patient, it may take time to prepare and cure the material forming the denture mold, which is a burden on the patient. Therefore, if the dentition 810 is directly scanned and a three-dimensional shape of the dentition 810 can be acquired instead of acquiring such a denture mold, the burden on the patient related to the acquisition of the denture mold can be reduced. The oral cavity is narrow, and simultaneous insertion of a plurality of cameras for acquiring the three-dimensional shape is difficult. Therefore, it is conceivable to scan the dentition 810 a plurality of times by the cameras, such as scanning one side surface, scanning the other side surface, and further scanning an upper surface, of the dentition 810. However, scanning the dentition 810 a plurality of times also places a heavy burden on the patient.

By the way, in the dental treatment, an instrument including a small mirror portion (mirror top) and a handle portion (mirror handle), called mirror (dental mirror), is used to observe a region in the oral cavity that is difficult to visually observe from the outside. Therefore, an application such as a monitoring device is conceivable, which scans the dentition 810 once by combining the mirror with the distance measuring camera 10 according to the present embodiment.

More specifically, as illustrated in FIG. 11, a dental instrument 800 according to application 1 of the embodiment of the present disclosure includes a handle portion 802 for being gripped by a dentist, the distance measuring camera 10, a small mirror portion (specular reflector) 20*d*. Moreover, the dental instrument 800 includes the fixing member 806 that fixes the distance between the distance measuring camera 10 and the mirror portion 20, and a joint portion 804 that connects the handle portion 802 and the fixing member 806. In the example in FIG. 11, since the distance between the distance measuring camera 10 and the mirror portion 20d is fixed to a predetermined distance by the fixing member 806, and the posture of the mirror portion 20 is fixed, measurement of the position and posture of the mirror portion 20d is unnecessary. Therefore, the above-described marker 200 does not need to be attached to the surface of the mirror portion 20d. Furthermore, in the example in FIG. 11, the joint portion 804 has a rotatable structure, and the distance measuring camera 10 and the mirror portion 20d are rotated about the joint portion 804 as a rotation axis while mutual relative positions are fixed, so that the dentition 810 (object 50) at various positions can be scanned.

Furthermore, in the present application, since the measurement at a very short distance is performed, there is a possibility that the intensity of the light emitted by the distance measuring camera 10 is too strong and the sensitivity of the light receiving unit 104 of the distance measuring camera 10 becomes saturated. Therefore, in the present application, the intensity of the light emitted by the distance measuring camera 10 is favorably set to a condition suitable for the short distance measurement in order to avoid such saturation.

Furthermore, in the present application, the distance between the distance measuring camera 10 and the mirror portion 20d does not need to be fixed as long as the position and posture of the mirror portion 20d can be measured using the marker 200 or the like. In this case, for example, the distance measuring camera 10 and the mirror portion 20d may be separated or may be made mutually freely movable.

By applying the embodiment of the present disclosure as described above, a plurality of distance measuring cameras 10 is not necessary. Therefore, measurement in a narrow space such as an oral cavity into which the plurality of distance measuring cameras 10 is less easily inserted becomes easy. Furthermore, in treatment or the like where scanning of not only an oral cavity but also various portions in a body of a patient is required, the present embodiment can be applied. Furthermore, the measurement of the position and posture of the mirror portion 20d becomes unnecessary by using the fixing member 806 for fixing the distance between the distance measuring camera 10 and the mirror portion 20d.

<5.2 Application 2>

Figure 12:
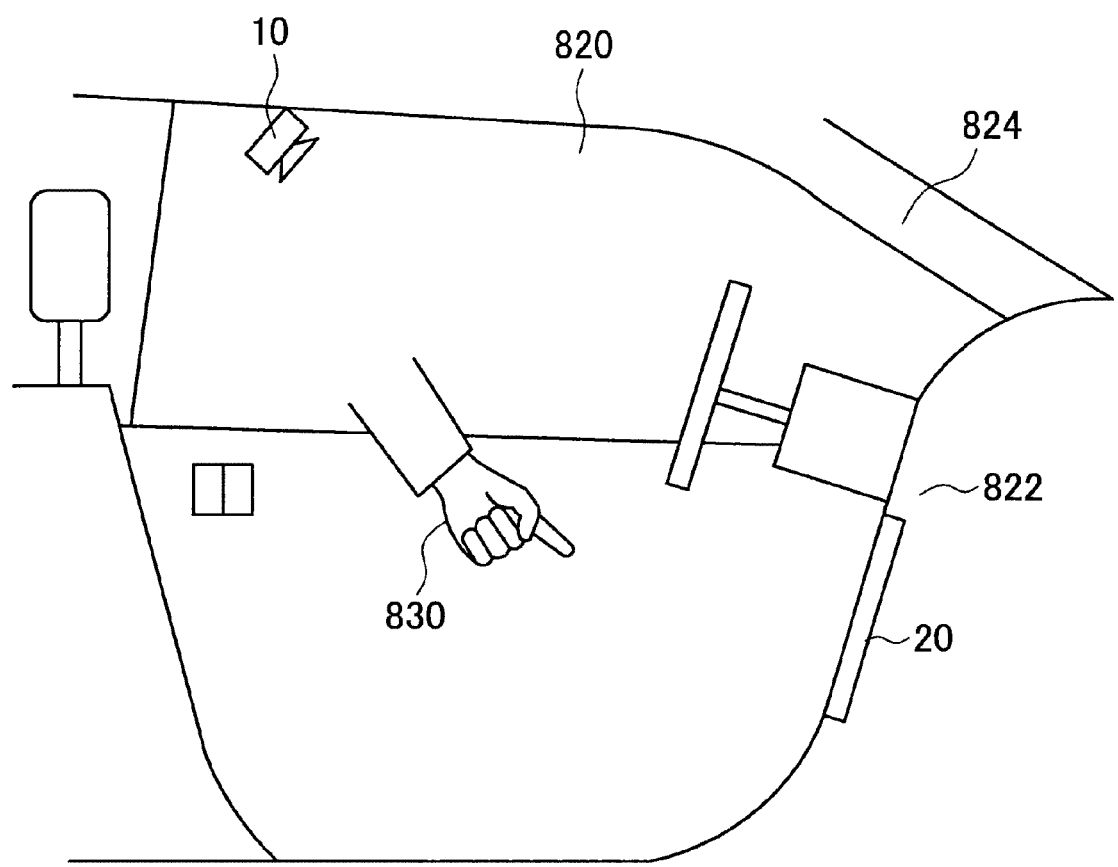
FIG. 12 is an explanatory diagram for describing an application 2 of the embodiment.

Next, an application 2 of the embodiment of the present disclosure will be described with reference to FIG. 12. FIG. 12 is an explaining diagram for describing an application 2 of the present embodiment, and illustrates an example of recognizing a gesture of a user who gets on a vehicle 820 using the present embodiment. Note that FIG. 12 illustrates, for the sake of clarity, only a hand (hand gesture) 830 of the user who gets on the vehicle 820, and illustration of the other body parts of the user is omitted.

More specifically, consider a case where the user (driver or the like) performs an operation for audio, car navigation, air conditioner, or the like of the vehicle 820 using the hand gesture 830 in the vehicle 820. In such a case, as illustrated in FIG. 12, in the present application, the distance measuring camera 10 is installed on a ceiling in the vehicle 820, and the hand gesture 830 is recognized by the distance measuring camera 10. At this time, as illustrated in FIG. 12, in a case where the user performs the hand gesture 830 such as extending an index finger toward a dashboard 822, the index finger is hidden behind the back of the hand of the user depending on the position of the distance measuring camera 10 or the direction of the hand of the user. As a result, the hand gesture 830 with the index finger may not be recognized by the distance measuring camera 10.

Therefore, in the present application, the specular reflector 20 is installed on the dashboard 822, as illustrated in FIG. 12. By doing so, the distance measuring camera 10 can recognize the hand gesture 830 (object 50) with the index finger blocked by the back of the hand, using the specular reflector 20. At this time, since the specular reflector 20 is only required to reflect infrared rays emitted from the distance measuring camera 10, for example, the specular reflector 20 may be a film that reflects the infrared rays. Furthermore, the embodiment of the present disclosure can be implemented when the position where the mirror image 602 appears is known with respect to the real image 600. Therefore, in the present application, a front window 824 having a known curvature may be used as the specular reflector 20 by attaching a film that reflects infrared rays to the front window 824.

As described above, in the present application, the distance measuring system 1 according to the present embodiment is applied to a monitoring device that recognizes the hand gesture 830 in the vehicle. By doing so, according to the present application, the hand gesture 830 with a fingertip or the like, which is blocked and cannot be recognized, becomes able to be recognized by the distance measuring camera 10 installed on the ceiling in the vehicle 820. Therefore, according to the present application, a more complicated hand gesture 830 can be discriminated. Therefore, the number of types of discriminable hand gestures 830 can be increased, and more various devices and the like in the vehicle 820 can be easily operated by the user, even with one distance measuring camera 10.

<5.3 Application 3>

Figure 13:
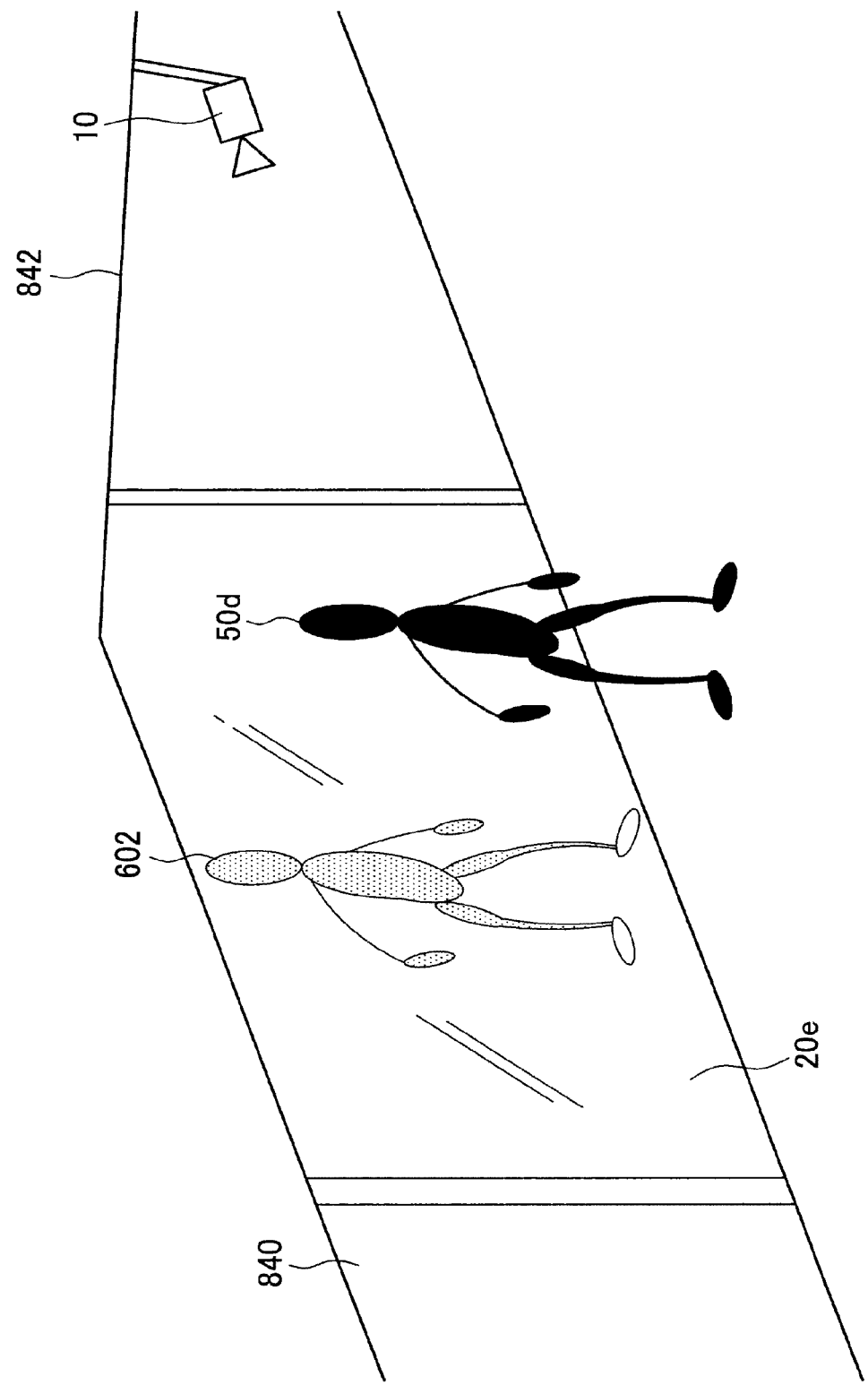
FIG. 13 is an explanatory diagram for describing an application 3 of the embodiment.

Next, an application 3 of the embodiment of the present disclosure will be described with reference to FIG. 13. FIG. 13 is an explanatory diagram for describing an application 3 of the present embodiment, and is specifically an explanatory diagram for describing a three-dimensional monitoring system for scanning movement of a whole body of a person 50d in motion, for example, using the present embodiment.

In three-dimensionally scanning the movement of the person in motion, a system called motion tracking device is often used. The motion tracking device can three-dimensionally scan movement of a person by, for example, attaching a plurality of markers formed using a retroreflecting material to the person, and tracking the movement of the plurality of markers caused by the movement of the person. However, such a device is expensive, and the movement of the person may be blocked because the plurality of markers is attached to the person. Therefore, in the present application, the movement of the person is three-dimensionally scanned without attaching the plurality of markers to the person, applying the above-described distance measuring system 1 to the above-described three-dimensional motion monitoring system (monitoring device).

More specifically, as illustrated in FIG. 13, in a facility such as a gym, a large mirror 20e is often provided on one surface of a wall 840 for the person 50d to recognize the movement of the person 50d. Therefore, in the present application, such a large mirror 20e is used as the specular reflector 20. Moreover, as illustrated in FIG. 13, the distance measuring camera 10 is installed on a ceiling 842 of the facility or toward the back of the person 50d to be the object 50. Then, by continuously acquiring the real image 600 and the mirror image 602 of the person 50d by the distance measuring camera 10, the movement of the person 50d in motion can be three-dimensionally scanned.

In the above-described embodiment of the present disclosure, even in a case where the person 50d performs exercise, in other words, in a case where the shape of the object 50 or the like changes over time, the error caused by the interference 700 due to multipath is not corrected on the basis of an element that changes over time. Therefore, even in the case where the person 50d as the object 50 performs exercise, in other words, in the case where the object 50 changes over time, the distance measuring system 1 according to the present embodiment can be applied, and the movement of the object 50 (person 50d) can be three-dimensionally scanned with high accuracy.

Note that, in the above description, installation of one distance measuring camera 10 and one mirror 20e has been described, as illustrated in FIG. 13. However, in the present application, the number of the mirrors 20e is not limited to one, and three mirrors 20e surrounding the person 50d as the object 50 may be installed. In this case, not only the front and the back of the person 50d but also a side of the person 50d can be scanned. Note that, at this time, to correct an error caused by the interference 700 due to multipath caused by the plurality of mirrors 20e, the position of each mirror image 602 with respect to the real image 600 is required to be known.

<5.4 Application 4>

Figure 14:
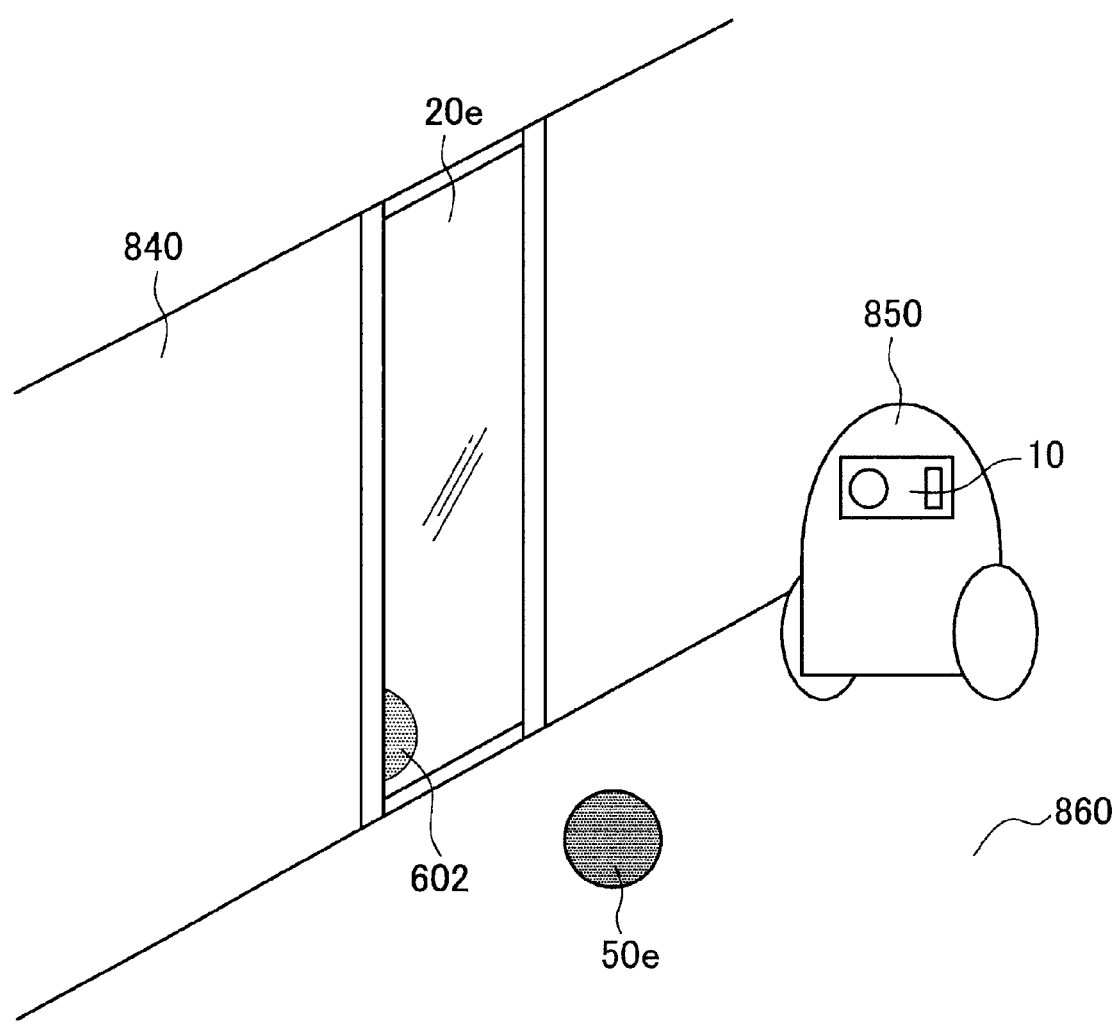
FIG. 14 is an explanatory diagram for describing an application 4 of the embodiment.

Next, an application 4 of the embodiment of the present disclosure will be described with reference to FIG. 14. FIG. 14 is an explanatory diagram for describing an application 4 of the present embodiment, and is specifically an explanatory diagram for describing an environment monitoring system for three-dimensionally scanning an ambient environment of a robot 850 by the robot 850.

In recent years, the technology related to the robot 850 has dramatically improved, and the robot 850 can move autonomously in a certain region, not only on a predetermined route. In such a case, the robot 850 may estimate a self-position of the robot 850 using simultaneous localization and mapping (SLAM) or the like. Moreover, SLAM generates a map around the robot 850 at the same time with self-position estimation. Note that SLAM can be implemented by devices such as a stereo camera using parallax, the above-described distance measuring camera 10 of the TOF method, and a laser finder. In the following description, the robot 850 refers to a device that can autonomously move and perform operations and the like.

Therefore, in the present application, as illustrated in FIG. 14, a case of using the robot 850 that executes SLAM using the distance measuring camera 10 of the TOF method in a room such as a home or a factory will be considered. As described so far, in the distance measuring camera 10 of the TOF method, in a case where the specular reflector 20 is present in the surroundings, the interference 700 due to multipath occurs and an error occurs in the measurement of the object 50. For example, consider a case where the large mirror 20e is installed on the wall 840 in the room where the robot 850 moves. The distance measuring camera 10 of the robot 850 sometimes recognizes that a floor 860 has a distorted shape caused by the interference 700 due to multipath caused by the mirror 20e even though the floor 860 (object 50) is originally flat. Similarly, the distance measuring camera 10 of the robot 850 cannot correctly recognize the shape of an obstacle 50e (object 50) existing in the room. As a result, the robot 850 may not be able to accurately generate a map around the robot 850.

Therefore, in the present application, the above-described present embodiment is applied as a monitoring device that scans the ambient environment of the robot 850. By doing so, the error caused by the interference 700 due to multipath caused by the mirror 20e can be corrected. Therefore, in the present application, the map around the robot 850 can be accurately generated. Note that, in the above case, it is assumed that the position and posture of the mirror 20e are known.

Furthermore, in a space where a human cannot easily enter, a map regarding the space may be generated using two robots 850. In the present application, the distance measuring camera 10 according to the present embodiment is installed in one robot 850, and the specular reflector 20 according to the present embodiment is installed in the other robot 850. These two robots 850 move such that the distance measuring camera 10 and the specular reflector 20 face each other, thereby scanning an object or the like in the space, and can generate an accurate map even in the space where a human cannot easily enter. Note that, in the above case, the scanning of the object or the like is performed after grasping the relative positional relationship and postures of the robot 850 having the distance measuring camera 10 and the robot 850 having the specular reflector 20.

6. Conclusion

According to the embodiment of the present disclosure, by providing the specular reflector 20, the real image 600 and the mirror image 602 of the object 50 can be simultaneously measured by one distance measuring camera 10. Therefore, according to the present embodiment, a region such as the back surface of the object 50, which is difficult to directly measure by one distance measuring camera 10, due to blockage by the object 50 itself or the like, can be measured. Furthermore, according to the present embodiment, since the distance measuring system 1 can be configured by one distance measuring camera 10, an increase in cost for constructing the distance measuring system 1 can be suppressed.

By the way, even with one distance measuring camera 10, the front and back of the object 50 can be simultaneously measured by rotationally moving the distance measuring camera 10 around the object 50, or the like. However, in such a case, measurement cannot be performed in a case where the object 50 dynamically changes over time. However, according to the present embodiment, even such an object 50 can be handled by the single distance measuring camera 10.

Furthermore, since use of a plurality of the distance measuring cameras 10 is not assumed, according to the present embodiment, synchronization between the distance measuring cameras 10 is not necessary, and therefore provision of a synchronization circuit and the like is not necessary. Moreover, according to the present embodiment, use in a narrower space is easy than a case of using the plurality of distance measuring cameras 10.

Moreover, in the case of combining images obtained by the plurality of distance measuring cameras 10 to obtain a three-dimensional image, parts of regions measured by the plurality of distance measuring cameras 10 are required to overlap one another to appropriately align the three-dimensional point groups acquired by the distance measuring cameras 10. In other words, in the above case, there are restrictions on the installation positions of the plurality of distance measuring cameras 10. However, according to the present embodiment, since the system can be configured by the single distance measuring camera 10, the alignment is not necessary, and therefore the position of the distance measuring camera 10 can be freely set.

Furthermore, in the present embodiment, the interference 700 due to multipath occurs due to the installation of the specular reflector 20. However, correction of the error caused by the interference 700 can be performed using the model indicating the phase of light affected by the interference 700. Therefore, according to the present embodiment, the distance and shape of the object 50 can be accurately measured. Furthermore, there are some cases where the region where the interference 700 due to multipath occurs and the region where the interference 700 due to multipath does not occur coexist depending on the shape of the object 50. Even in such a case, according to the present embodiment, the correction can be performed after determining the presence or absence of the occurrence of the interference 700. Therefore, failure of acquisition of an accurate measurement value due to excessive correction for the region that does not require the correction can be avoided.

7. Hardware Configuration

Figure 15:
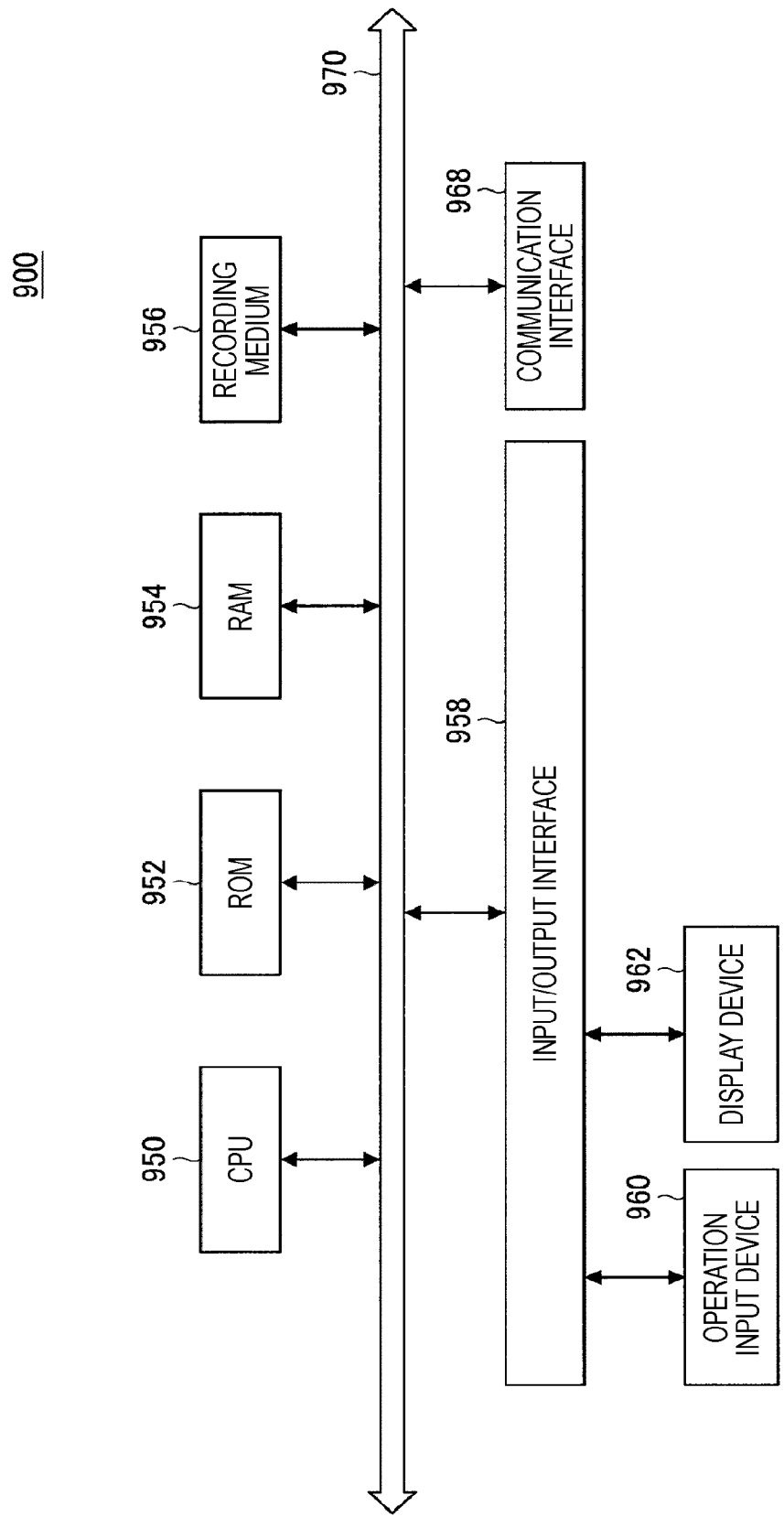
FIG. 15 is an explanatory diagram illustrating an example of a hardware configuration of a processing device 900 according to the embodiment.

FIG. 15 is an explanatory diagram illustrating an example of a hardware configuration of a processing device 900 according to the present embodiment. In FIG. 15, the processing device 900 illustrates an example of a hardware configuration of the above-described processing device 30.

The processing device 900 includes, for example, a CPU 950, a ROM 952, a RAM 954, a recording medium 956, an input/output interface 958, and an operation input device 960. Moreover, the processing device 900 includes a display device 962, a communication interface 968, and a sensor 980. Furthermore, the processing device 900 has the configuration elements connected with a bus 970 as a data transmission path, for example.

(CPU 950)

The CPU 950 includes, for example, one or more processors including an arithmetic circuit such as a CPU, various processing circuits, and the like, and functions as a control unit (for example, the above-described control unit 350) that controls the entire processing device 900. Specifically, the CPU 950 functions as, for example, the distance calculation unit 300, the correction unit 310, the determination unit 320, the image processing unit 330, the control unit 350, and the like in the processing device 900.

(ROM 952 and RAM 954)

The ROM 952 stores a program and control data such as calculation parameters used by the CPU 950, and the like. The RAM 954 temporarily stores the program to be executed by the CPU 950, or the like, for example.

(Recoding Medium 956)

The recording medium 956 stores, for example, various data such as data related to the measurement method according to the present embodiment and various applications. Here, examples of the recording medium 956 include a magnetic recording medium such as a hard disk, and a nonvolatile memory such as a flash memory. Furthermore, the recording medium 956 may be attachable to and detachable from the processing device 900.

(Input/Output Interface 958, Operation Input Device 960, and Display Device 962)

The input/output interface 958 connects, for example, the operation input device 960, the display device 962, and the like. Examples of the input/output interface 958 include a universal serial bus (USB) terminal, a digital visual interface (DVI) terminal, a high-definition multimedia interface (HDMI) (registered trademark) terminal, various processing circuits, and the like.

The operation input device 960 functions as, for example, an input unit that receives a user's operation for the processing device 900, and is connected to the input/output interface 958 inside the processing device 900.

The display device 962 functions as an output unit that outputs an image or the like to the user, for example, is provided on the processing device 900, and is connected to the input/output interface 958 inside the processing device 900. Examples of the display device 962 include a liquid crystal display, an organic electro-luminescence (EL) display, and the like.

Note that the input/output interface 958 can be connected to an external device such as an operation input device (for example, a keyboard, a mouse, or the like) outside the processing device 900 or an external display device. Furthermore, the input/output interface 958 may be connected to a drive (not illustrated). The drive is a reader/writer for a removable recording medium such as a magnetic disk, an optical disk, or a semiconductor memory, and is built in or externally attached to the processing device 900. The drive reads information recorded on a mounted removable recording medium and outputs the information to the RAM 954. Furthermore, the drive can also write a record to the mounted removable recording medium.

(Communication Interface 968)

The communication interface 968 functions as the communication unit 360 for performing wireless or wired communication with an external device such as the distance measuring camera 10 via the above-described communication cable 60 (or directly), for example. Here, examples of the communication interface 968 include a communication antenna and radio frequency (RF) circuit (wireless communication), IEEE802.15.1 port and transmission/reception circuit (wireless communication), IEEE802.11 port and transmission/reception circuit (wireless communication), and a local area network (LAN) terminal, a transmission/reception circuit (wired communication), and the like.

An example of the hardware configuration of the processing device 900 has been described above. Note that the hardware configuration of the processing device 900 is not limited to the configuration illustrated in FIG. 15. In detail, each of the above-described configuration elements may be configured using general-purpose members or may be configured by hardware specialized for the function of the each configuration element. Such a configuration may be changed as appropriate depending on the level of technology to be implemented.

For example, the processing device 900 does not need to include the communication interface 968 in a case of communicating with the distance measuring camera 10 or the like via a connected external communication device, or in a case of performing stand-alone processing. Furthermore, the communication interface 968 may have a configuration capable of communicating with one or more external devices by a plurality of communication methods. Furthermore, the processing device 900 can be configured not to include the recording medium 956, the operation input device 960, the display device 962, and the like, for example.

Furthermore, the processing device 900 according to the present embodiment may be a system including a plurality of devices on the premise of connection to a network (or communication between devices) such as cloud computing, for example. That is, the processing device 900 according to the above-described present embodiment can be implemented as a processing system that performs processing according to the measurement method according to the present embodiment using a plurality of devices, for example.

8. Supplement

The steps in the measurement method according to the above-described embodiment do not necessarily need to be processed in the described order. For example, the steps may be processed in an appropriately changed order. Furthermore, the steps may be partially processed in parallel or individually processed instead of being chronologically processed. Moreover, the steps do not necessarily need to be processed in accordance with the described method, and may be processed by another method using another functional block, for example.

Furthermore, at least a part of the measurement method according to the above-described embodiment can be configured by software as an information processing program for causing a computer (processing device 30 or 900) to function. In the case of configuring at least a part of the measurement method by software, a program that implements at least a part of the method may be stored in a recording medium and read and executed by the processing device 30 (900) and the like, or by another device connected to the processing device 30 (900). Furthermore, a program that implements at least a part of the processing method may be distributed via a communication line (including wireless communication) such as the Internet. Moreover, the program may be distributed via a wired line or a wireless line such as the Internet, or stored in a recording medium, in a state of being encrypted, modulated, or compressed.

Although the favorable embodiments of the present disclosure have been described in detail with reference to the accompanying drawings, the technical scope of the present disclosure is not limited to such examples. It is obvious that persons having ordinary knowledge in the technical field of the present disclosure can conceive various changes and alterations within the scope of the technical idea described in the claims, and it is naturally understood that these changes and alterations belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Note that following configurations also belong to the technical scope of the present disclosure.

(1) An imaging device including:
a sensor unit configured to irradiate an object with light and detect the light reflected by the object;
a distance calculation unit configured to calculate a distance to the object on the basis of sensing data of the sensor unit;
a specular reflector located on an opposite side of the sensor unit across the object; and
a correction unit configured to correct an error included in the calculated distance, the error being caused by an interference between the light following a first path from the sensor unit toward the object and the light following a second path from the sensor unit, reflected by the specular reflector, and going toward the object.

(2) The imaging device according to (1), further including a fixing member that fixes a distance between the sensor unit and the specular reflector.

(3) An imaging device including: a sensor unit configured to irradiate an object with light and detect the light reflected by the object; a distance calculation unit configured to calculate a distance to the object on the basis of sensing data of the sensor unit; and a correction unit configured to correct an error included in the calculated distance, the error being caused by an interference between the light following a first path from the sensor unit toward the object and the light following a second path from the sensor unit, reflected by a specular reflector located on an opposite side of the sensor unit across the object, and going toward the object.

(4) The imaging device according to any one of (1) to (3), in which the sensor unit includes an irradiation unit configured to emit the light, a light receiving unit configured to receive the reflected light, and a phase difference calculation unit configured to calculate a phase difference between the emitted light and the received light, and the distance calculation unit calculates the distance on the basis of the phase difference.

(5) The imaging device according to (1), in which the correction unit corrects the error by comparing the sensing data of the sensor unit with an estimation value estimated to occur by the interference.

(6) The imaging device according to any one of (1) to (5), further including a determination unit configured to determine presence or absence of occurrence of the error by the interference.

(7) The imaging device according to (6), in which the determination unit determines the presence or absence of occurrence of the error according to presence or absence of match between a real image of the object to which the correction has been applied and a mirror image of the object to which the correction has been applied and projected on the specular reflector.

(8) The imaging device according to (7), further including a color sensor unit configured to acquire a color image of the object, in which the determination unit determines presence or absence of the error by comparing a color image of the real image of the object with a color image of the mirror image.

(9) The imaging device according to any one of (1) to (8), in which the specular reflector is provided with a marker having a non-glossy surface.

(10) The imaging device according to (9), in which the marker includes three or more marker portions provided spaced from one another.

(11) The imaging device according to any one of (1) to (8), further including a specular reflector sensor unit configured to measure a distance to the specular reflector.

(12) A monitoring device having an imaging device mounted, the imaging device including: a sensor unit configured to irradiate an object with light and detect the light reflected by the object; a distance calculation unit configured to calculate a distance to the object on the basis of sensing data of the sensor unit; and a correction unit configured to correct an error included in the calculated distance, the error being caused by an interference between the light following a first path from the sensor unit toward the object and the light following a second path from the sensor unit, reflected by a specular reflector located on an opposite side of the sensor unit across the object, and going toward the object.

REFERENCE SIGNS LIST

1 Distance measuring system
10 Distance measuring camera
20, 20a to c Specular reflector 20d Mirror portion
20e Mirror
30, 900 Processing device
50 Object
50a Front surface
50b Back surface
50c Upper surface
50d Person
50e Obstacle
60 Communication cable
100 Sensor unit
102 Irradiation unit
104 Light receiving unit
110 Phase difference calculation unit
120 Imaging unit
150, 350 Control unit
160, 360 Communication unit
200, 200a to c Marker
300 Distance calculation unit
310 Correction unit
320 Determination unit
330 Image processing unit
500 First path
502 Second path
600 Real image
602 Mirror image
700 Interference
800 Dental instrument
802 Handle portion
804 Joint portion
806 Fixing member
810 Dentition
820 Vehicle
822 Dashboard
824 Front window
830 Hand gesture
840 Wall
842 Ceiling
850 Robot
860 Floor
950 CPU
952 ROM
954 RAM
956 Recoding medium
958 Input/output interface
960 Operation input device
962 Display device
968 Communication interface
970 Bus

The invention claimed is:

1. An imaging device comprising:
a sensor configured to irradiate an object with light and detect the light reflected by the object;
distance calculation circuitry configured to calculate a distance to the object on a basis of sensing data of the sensor;
a specular reflector located on an opposite side of the sensor across the object; and
correction circuitry configured to correct an error included in the calculated distance, the error in the calculated distance being caused by an interference between the light following a first path from the sensor toward the object and the light following a second path from the sensor, then reflected by the specular reflector, and then going toward the object.

2. The imaging device according to claim 1, further comprising a fixing member that fixes a distance between the sensor and the specular reflector.

3. An imaging device comprising:
a sensor configured to irradiate an object with light and detect the light reflected by the object;
distance calculation circuitry configured to calculate a distance to the object on a basis of sensing data of the sensor; and
correction circuitry configured to correct an error included in the calculated distance, the error in the calculated distance being caused by an interference between the light following a first path from the sensor toward the object and the light following a second path from the sensor, then reflected by a specular reflector located on an opposite side of the sensor across the object, and then going toward the object.

4. The imaging device according to claim 1, wherein the sensor includes
irradiation circuitry configured to emit the light,
light receiving circuitry configured to receive the reflected light, and
phase difference calculation circuitry configured to calculate a phase difference between the emitted light and the received light, and
the distance calculation circuitry calculates the distance on a basis of the phase difference.

5. The imaging device according to claim 1, wherein the correction circuitry corrects the error by comparing the sensing data of the sensor with an estimation value estimated to occur by the interference.

6. The imaging device according to claim 1, further comprising determination circuitry configured to determine presence or absence of occurrence of the error by the interference.

7. The imaging device according to claim 6, wherein the determination circuitry determines the presence or absence of occurrence of the error according to presence or absence of match between a real image of the object to which the correction has been applied and a mirror image of the object to which the correction has been applied and projected on the specular reflector.

8. The imaging device according to claim 7, further comprising
color sensor circuitry configured to acquire a color image of the object, wherein
the determination circuitry determines presence or absence of the error by comparing a color image of the real image of the object with a color image of the mirror image.

9. The imaging device according to claim 1, wherein the specular reflector is provided with a marker having a non-glossy surface.

10. The imaging device according to claim 9, wherein the marker includes three or more marker portions provided spaced from one another.

11. The imaging device according to claim 1, further comprising specular reflector sensor circuitry configured to measure a distance to the specular reflector.

12. A monitoring device comprising the imaging device according to claim 1.

13. A monitoring device comprising the imaging device according to claim 3.

14. An imaging device comprising:
a memory storing program code; and
a processor the executes the program code to perform operations comprising:

irradiating an object with light, using a sensor with a light source that emits the light, wherein a specular reflector is located on an opposite side from the sensor across the object, detecting the light reflected by the object, calculating a distance to the object on a basis of sensing data of the sensor, and correcting an error included in the calculated distance, the error in the calculated distance being caused by an interference between the light following a first path from the sensor that extends directly from the light source toward the object and the light following a second path from the sensor, then reflected by the specular reflector, and then going toward the object.

15. The imaging device according to claim 14, wherein correcting the error further comprises comparing the sensing data of the sensor with an estimation value estimated to occur by the interference.

16. The imaging device according to claim 14, wherein the operations further comprise determining presence or absence of occurrence of the error by the interference.

17. The imaging device according to claim 16, wherein said determining the presence or absence of occurrence of the error according to presence or absence of match between a real image of the object to which the correction has been applied and a mirror image of the object to which the correction has been applied and projected on the specular reflector.

18. The imaging device according to claim 17, wherein the operations further comprise acquiring a color image of the object, wherein said determining the presence or absence of the error compares a color image of the real image of the object with a color image of the mirror image.

19. The imaging device according to claim 14, wherein the specular reflector is provided with a marker having a non-glossy surface.

20. The imaging device according to claim 19, wherein the marker includes three or more marker portions provided spaced from one another.

* * * * *